(12) United States Patent
Sakai

(10) Patent No.: US 10,742,455 B2
(45) Date of Patent: Aug. 11, 2020

(54) EQUALIZER ADJUSTING DEVICE, EQUALIZER ADJUSTING METHOD, RECEIVER, AND SIGNAL TRANSMITTING AND RECEIVING SYSTEM

(71) Applicant: THINE ELECTRONICS, INC., Tokyo (JP)

(72) Inventor: Tomohiro Sakai, Tokyo (JP)

(73) Assignee: THINE ELECTRONICS, INC., Chiyoda-ku, Tokyo (JP)

( * ) Notice: Subject to any disclaimer, the term of this patent is extended or adjusted under 35 U.S.C. 154(b) by 0 days.

(21) Appl. No.: 16/508,412

(22) Filed: Jul. 11, 2019

(65) Prior Publication Data

US 2020/0021468 A1    Jan. 16, 2020

(30) Foreign Application Priority Data

Jul. 13, 2018  (JP) ................ 2018-133538

(51) Int. Cl.
*H04L 25/03* (2006.01)
*H04L 1/00* (2006.01)

(52) U.S. Cl.
CPC ...... *H04L 25/03159* (2013.01); *H04L 1/0047* (2013.01); *H04L 25/03057* (2013.01)

(58) Field of Classification Search
CPC ......... H04L 25/03057; H04L 25/03885; H04L 25/063; H04L 2025/03636; H04L 25/03159; H04L 25/0292
See application file for complete search history.

(56) References Cited

U.S. PATENT DOCUMENTS 8,705,606 B2 *   4/2014   Farjad-Rad ....... H04L 25/03343
                                                                    375/232

OTHER PUBLICATIONS

Valdimir Stojanović, et al., "Autonomous Dual-mode (PAM2/4) Serial Link Transceiver with Adaptive Equalization and Data Recovery", IEEE Journal of Solid-State Circuits, Apr. 2005, vol. 40, No. 4, pp. 1012-1026 (15 pages total).

* cited by examiner

*Primary Examiner* — Rahel Guarino
(74) *Attorney, Agent, or Firm* — Sughrue Mion, PLLC

(57) ABSTRACT

An equalizer adjusting device includes a comparator, an inequality counter, an adjuster, and the like. The comparator performs magnitude comparison between a voltage value Vout of each bit output from an equalizer and a threshold value MonLVL and outputs a logical value MonSMP according to a result of the comparison. The inequality counter inputs a logical value DatSMP output from a sampler in accordance with the result of magnitude comparison between the voltage value Vout of each bit and a reference value, and the logical value MonSMP output from the comparator and counts events in which the logical value DatSMP and the logical value MonSMP differ from each other, every period. The adjuster adjusts a gain of the equalizer and the threshold value MonLVL of the comparator based on a counted value of the inequality counter.

19 Claims, 17 Drawing Sheets

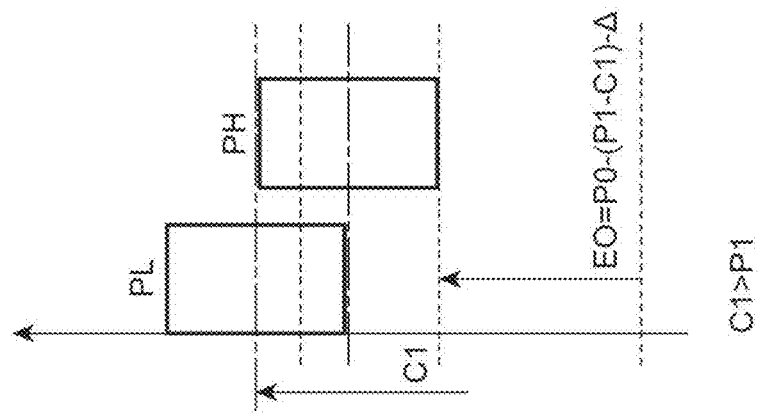
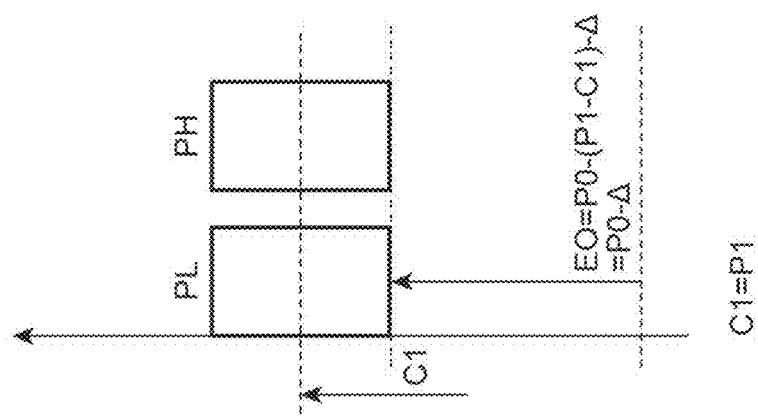
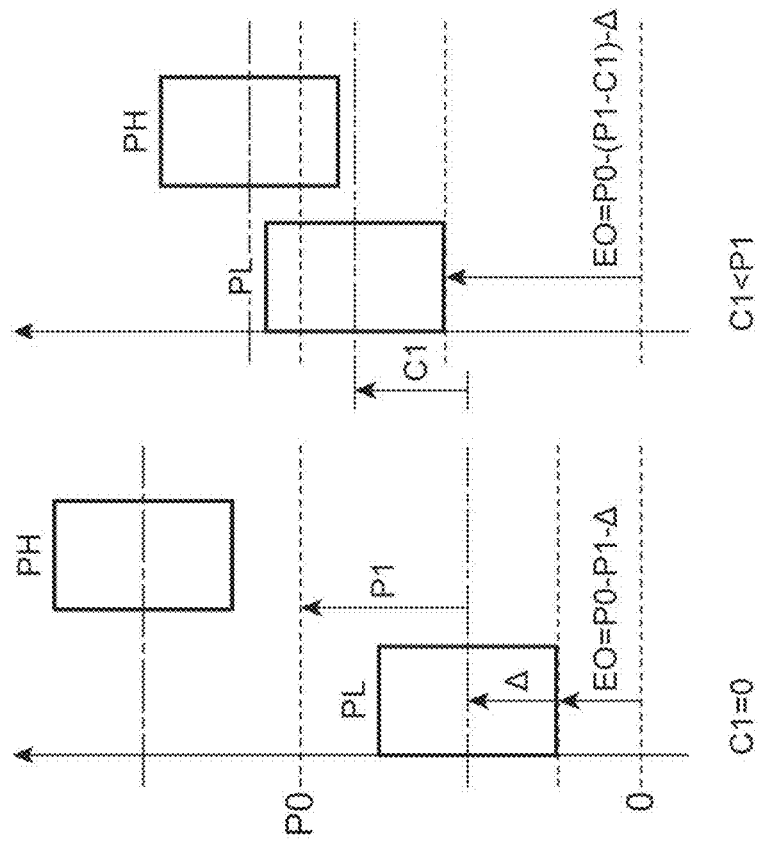

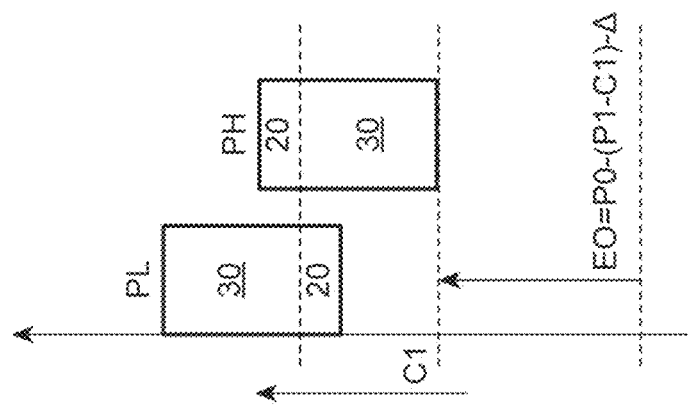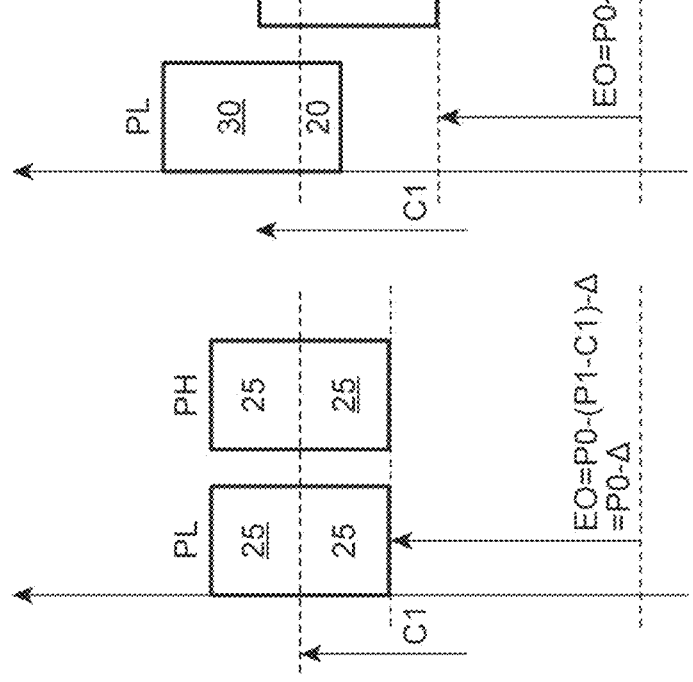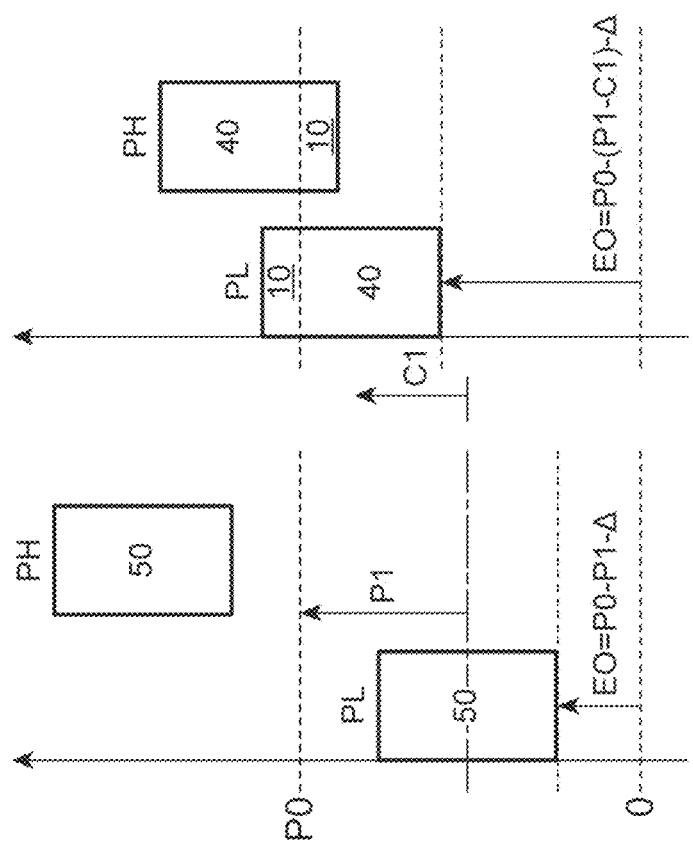

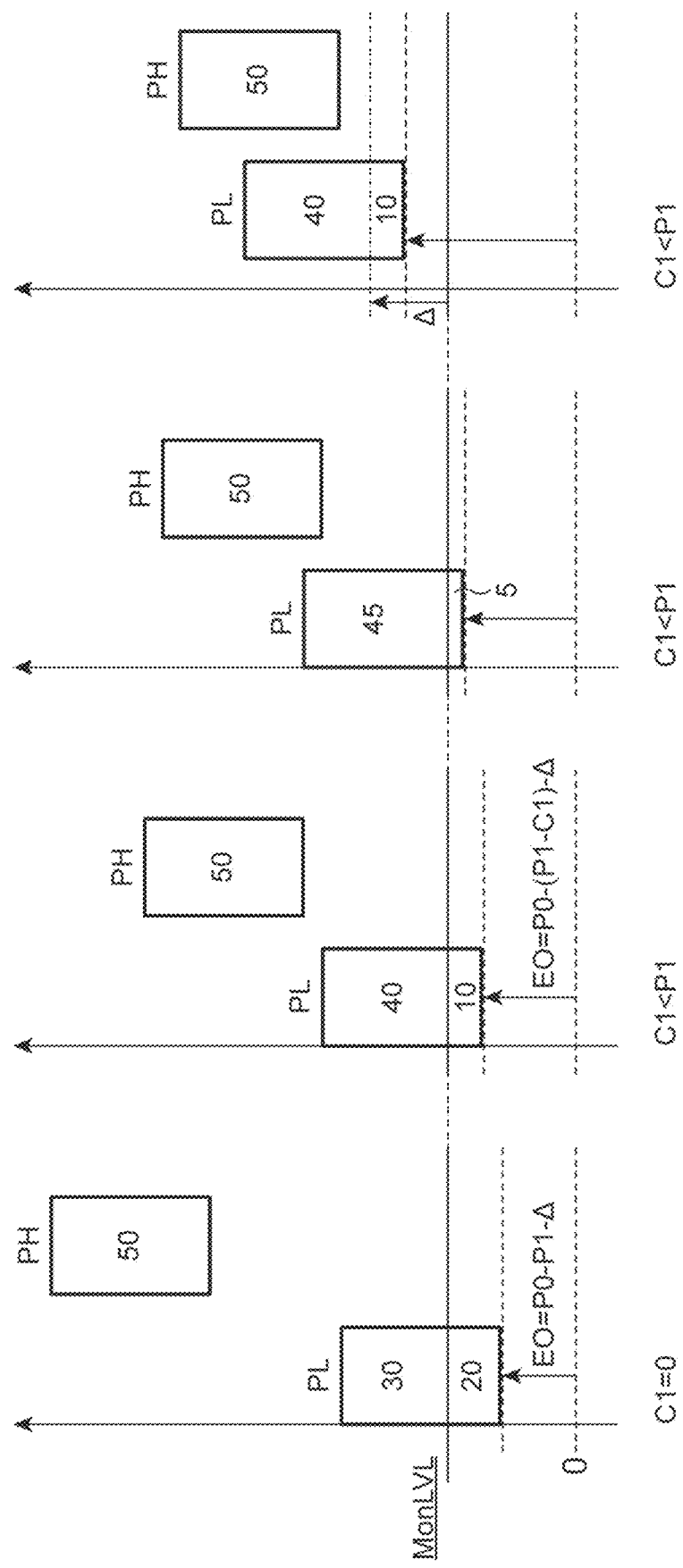

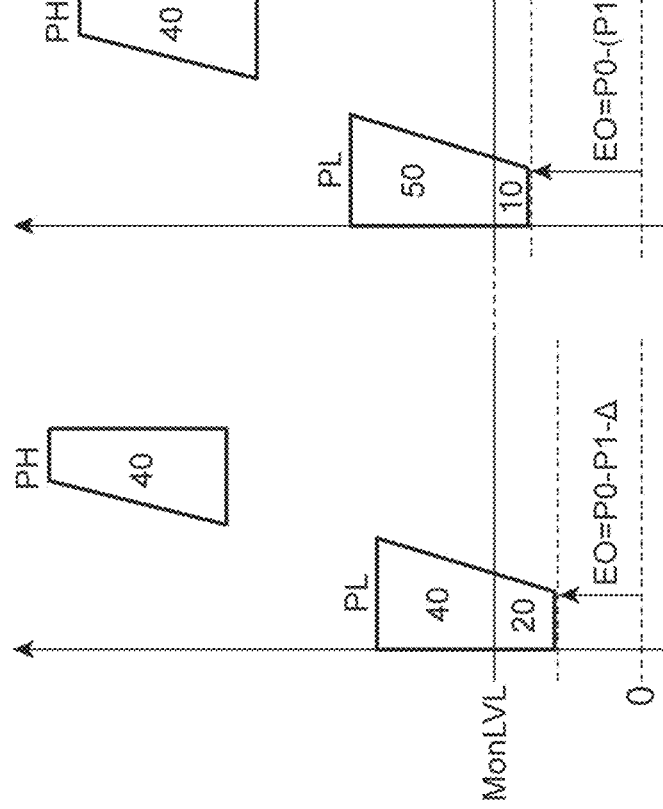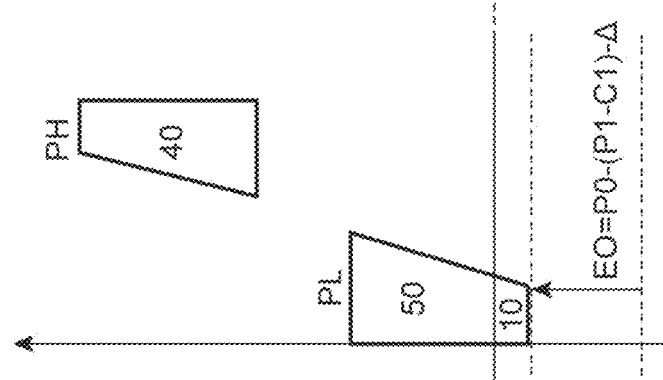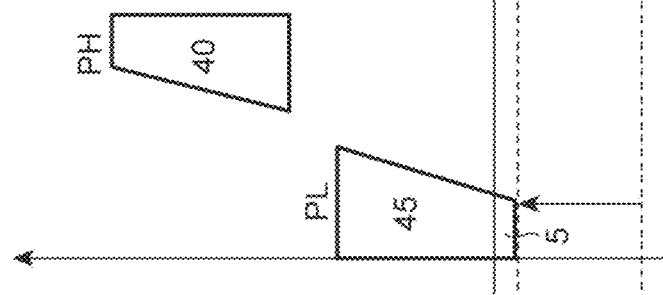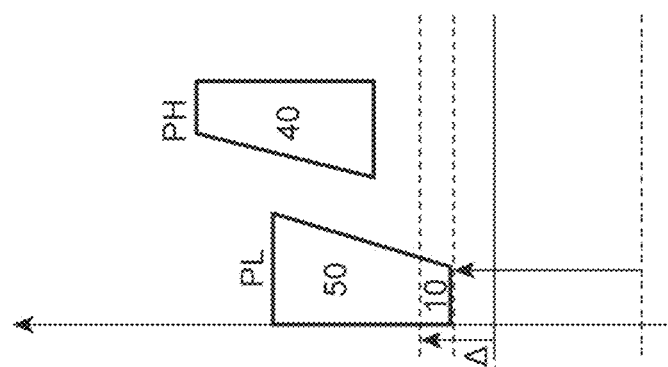

EQUALIZER ADJUSTING DEVICE, EQUALIZER ADJUSTING METHOD, RECEIVER, AND SIGNAL TRANSMITTING AND RECEIVING SYSTEM

TECHNICAL FIELD

The present invention relates to a device and a method for adjusting a gain of an equalizer, a receiver including such a device, and a signal transmitting and receiving system including such a receiver and a transmitter.

BACKGROUND

In a signal transmitting and receiving system configured to have a transmitter and a receiver connected to each other via a transmission path, a data array sent from the transmitter arrives at the receiver via the transmission path and is received by the receiver. In many signal transmitting and receiving systems, the transmitter converts parallel data into serial data and sends the serial data to the transmission path, and the receiver receives serial data and converts the serial data into parallel data.

The signal waveform of a data array when it arrives at the receiver is deteriorated compared to the signal waveform of the data array when it is sent from the transmitter. This deterioration in signal waveform is caused due to the frequency characteristics of the transmission path attenuating a high-frequency component more than a low-frequency component. When the degree of deterioration in signal waveform is significant, the frequency of erroneous receiving (bit error rate) of the receiver increases. Therefore, in many cases, receivers include an equalizer in the preceding stage of a sampler.

Since an equalizer has frequency characteristics capable of improving the frequency characteristics of a data array which has arrived from the transmitter, a deteriorated signal waveform can be restored, or the degree of deterioration can be reduced. Generally, since transmission paths attenuate a high-frequency component, the equalizer increases a high-frequency component of a data array or decreases a low-frequency component of the data array to improve the frequency characteristics of the data array. The sampler inputs the data array adjusted by the equalizer and outputs a logical value according to the result of magnitude comparison between a voltage value of a bit and a reference value for each bit of the data array. Equalizers of various types have become known. Examples of representative equalizers include continuous time linear equalizers (CTLEs) and decision feedback equalizers (DFEs).

The frequency characteristics of an equalizer ought to be set to compensate for the frequency characteristics of a transmission path between a transmitter and a receiver. In addition, since transmission paths vary in material and shape and vary in transmission characteristics, it is important to appropriately set an equalizer in an actual signal transmitting and receiving system configured to have a transmitter and a receiver connected to each other via a transmission path. Various algorithms for adjusting the frequency characteristics of an equalizer have become known, and examples of representative algorithms include sign-sign least mean square (SSLMS) (refer to Non-Patent Literature 1).

[Non-Patent Literature 1] V. Stojanovic, et al., "Autonomous Dual-mode (PAM 2/4) Serial Link Transceiver with Adaptive Equalization and Data Recovery", IEEE JSSC, vol. 40, no. 4, pp. 1012-1026, Apr. 2005

SUMMARY

Although SSLMS in the related art has enabled equalizers to have favorable frequency characteristics, the frequency characteristics of the equalizers are not always able to be optimized.

The present invention has been made to resolve the foregoing problem, and an object thereof is to provide an equalizer adjusting device and an equalizer adjusting method for enabling an equalizer to have more favorable frequency characteristics. In addition, another object of the present invention is to provide a receiver and a signal transmitting and receiving system including such an equalizer adjusting device and capable of further reducing a bit error rate.

According to the present invention, there is provided an equalizer adjusting device adjusting a gain of an equalizer that adjusts frequency characteristics of an input data array and outputs the adjusted data array to a sampler. The equalizer adjusting device includes (1) a comparator which outputs a logical value according to a result of magnitude comparison between a voltage value of a bit and a threshold value for each bit of the data array output from the equalizer; (2) an inequality counter which counts events in which a logical value output from the sampler in accordance with the result of magnitude comparison between the voltage value of the bit and a reference value, and the logical value output from the comparator differ from each other, every period for each bit of the data array output from the equalizer; and (3) an adjuster which adjusts the threshold value in the comparator in a direction in which a difference between the threshold value and the reference value in the sampler increases when a counted value of the inequality counter is zero, and adjusts the gain of the equalizer when the counted value of the inequality counter is not zero. The equalizer adjusting device of the present invention performs a counting operation of the inequality counter and an adjusting operation of the adjuster every period.

It is preferable that the equalizer adjusting device of the present invention further include an error counter which counts events in which an error is detected in a logical value array output from the sampler, every period. It is preferable that the adjuster adjust the gain of the equalizer based on the counted value of the inequality counter and a counted value of the error counter.

In the equalizer adjusting device of the present invention, it is preferable that the threshold value in the comparator be larger than the reference value in the sampler. It is preferable that the inequality counter selectively perform the counting operation in a case where the logical value output from the sampler is input when the voltage value of each bit input to the sampler is larger than the reference value. Alternatively, it is also preferable that the threshold value in the comparator be smaller than the reference value in the sampler. It is also preferable that the inequality counter selectively perform the counting operation in a case where the logical value output from the sampler is input when the voltage value of each bit input to the sampler is smaller than the reference value.

According to the present invention, there is provided a receiver including an equalizer which adjusts frequency characteristics of an input data array and outputs the adjusted data array; a sampler which outputs a logical value according to a result of magnitude comparison between a voltage value of a bit and a reference value for each bit of the data array output from the equalizer; and the equalizer adjusting device of the present invention adjusting a gain of the equalizer based on the data array output from the equalizer and a logical value array output from the sampler.

According to the present invention, there is provided a signal transmitting and receiving system including a transmitter which outputs a data array; and the receiver of the present invention to which the data array that has been output from the transmitter and has arrived via a transmission path is input.

According to the present invention, there is provided an equalizer adjusting method for adjusting a gain of an equalizer that adjusts frequency characteristics of an input data array and outputs the adjusted data array to a sampler. The equalizer adjusting method includes (1) a counting step for an inequality counter counting events in which a logical value output from the sampler in accordance with a result of magnitude comparison between a voltage value of a bit and a reference value, and a logical value output from a comparator in accordance with a result of magnitude comparison between the voltage value of the bit and a threshold value differ from each other, every period for each bit of the data array output from the equalizer; and (2) an adjusting step of adjusting the threshold value in the comparator in a direction in which a difference between the threshold value and the reference value in the sampler increases when a counted value of the inequality counter is zero, and adjusting the gain of the equalizer when the counted value of the inequality counter is not zero. The equalizer adjusting device of the present invention performs the counting step and the adjusting step every period.

In the equalizer adjusting method of the present invention, it is preferable that in the counting step, an error counter count events in which an error is detected in a logical value array output from the sampler, every period. It is preferable that in the adjusting step, the gain of the equalizer be adjusted based on the counted value of the inequality counter and a counted value of the error counter.

In the equalizer adjusting method of the present invention, it is preferable that in the counting step, the threshold value in the comparator be larger than the reference value in the sampler. It is preferable that a counting operation of the inequality counter be selectively performed in a case where the logical value output from the sampler is input when the voltage value of each bit input to the sampler is larger than the reference value. Alternatively, it is also preferable that in the counting step, the threshold value in the comparator be smaller than the reference value in the sampler. It is also preferable that the counting operation of the inequality counter be selectively performed in a case where the logical value output from the sampler is input when the voltage value of each bit input to the sampler is smaller than the reference value.

According to the present invention, an equalizer can have more favorable frequency characteristics, and a bit error rate can be further reduced.

BRIEF DESCRIPTION OF THE DRAWINGS

FIGS. 2A, 2B, 2C, and 2D are views describing a relationship between setting of an equalizer and an eye opening.

FIGS. 3A, 3B, 3C, and 3D are views describing equalizer adjustment using SSLMS.

FIGS. 10A, 10B, 10C, and 10D are views describing equalizer adjustment performed by the equalizer adjusting device or an equalizer adjusting method of the present embodiment.

FIGS. 12A, 12B, 12C, and 12D are views describing equalizer adjustment performed by the equalizer adjusting device or the equalizer adjusting method of the present embodiment in a case where a data array has an auto-correlation.

DETAILED DESCRIPTION

Hereinafter, with reference to the accompanying drawings, an embodiment of the present invention will be described in detail. In description of the drawings, the same reference signs are applied to the same elements, and duplicate description will be omitted. The present invention is not limited to the examples and it is intended to be indicated by the claims and to include the meaning equivalent to the claims and all the changes within the scope.

First, signal waveforms (particularly, eye patterns) of data arrays, an overview of SSLMS, and problems of the SSLMS will be described. Thereafter, an equalizer adjusting device, an equalizer adjusting method, a receiver, and a signal transmitting and receiving system of the embodiment will be described.

Figure 1A:
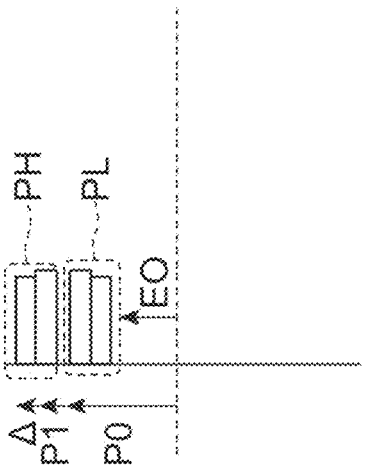
FIGS. 1A, 1B, and 1C are views describing an eye pattern and the like of a signal waveform.
Figure 1B:
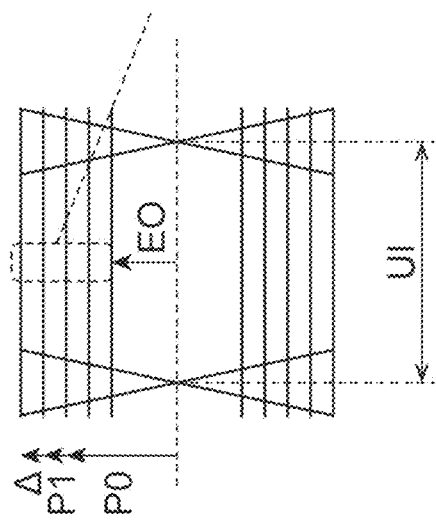
Figure 1C:
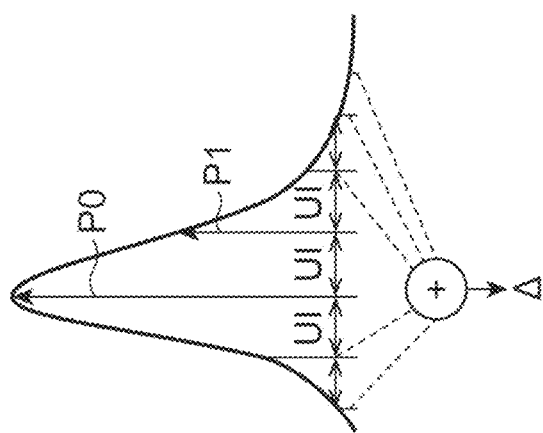

FIGS. 1A, 1B, and 1C are views describing an eye pattern and the like of a signal waveform. The signal waveform of a data array arriving at the receiver is expressed by a convolution integral of a signal waveform of a data array sent from a transmitter to a transmission path and a single bit response (FIG. 1A) of the transmission path and has an eye pattern (FIG. 1B) according to the frequency characteristics of the transmission path. In the diagrams, P0 indicates the peak value of a single bit response of the transmission path, P1 indicates a value after one unit interval (UI) from the peak, and Δ indicates the sum of values at integer multiples of the UI excluding P0 and P1.

A histogram of a voltage value (FIG. 1C) is obtained by performing frequency analysis of the voltage value at the center time during a period of each bit of a data array arriving at the receiver. FIG. 1C illustrates a histogram of a voltage value in a case where the voltage value at the center time during the period of each bit corresponds to an H level. The same applies to the histograms illustrated in other diagrams. The histogram in FIG. 1C is classified into a case where data of a bit preceding by one (which will hereinafter be referred to as "a preceding bit") is at the H level (which will be indicated as "PH" in the diagram) and a case where the data of the preceding bit is at an L level (which will be indicated as "PL" in the diagram). The voltage value of the histogram of the preceding H (PH) is within a range of (P0+P1)±Δ, and the voltage value of the histogram of the preceding L (PL) is within a range of (P0−P1)±Δ.

In FIG. 1A, the horizontal axis indicates time, and the vertical axis indicates voltage. In FIG. 1B, the horizontal axis indicates time, and the vertical axis indicates voltage. In FIG. 1C, the vertical axis indicates voltage, and the horizontal axis indicates frequency of voltage which becomes a target.

Such a histogram is useful for understanding the influence of an equalizer on an eye opening (EO) in an eye pattern. When the frequency characteristics of the equalizer are appropriately set, the eye opening in the signal waveform of a data array output from the equalizer can be increased, and therefore a bit error rate can be decreased.

FIGS. 2A, 2B, 2C, and 2D are views describing a relationship between setting of an equalizer and an eye opening. Here, a decision feedback equalizer (DFE) of one tap is postulated as the equalizer, and a tap coefficient is indicated as C1. The equalizer performs processing (tapping) of adding or subtracting a gain with respect to a sampled signal. FIG. 2A illustrates a histogram in a case of C1=0 (or in a case of using no equalizer). The size of the eye opening EO is expressed by the expression EO=P0−P1−Δ.

FIGS. 2A to 2D illustrate bars of histograms. In the diagrams, the vertical axes indicate voltage. The frequency of the voltage which becomes a target ought to be indicated as the length of the bar of the histogram in the horizontal axis direction. However, in the present example, in order to simplify the description, the frequencies of voltages are indicated to have the same lengths.

FIG. 2B indicates a histogram in a case of 0<C1<P1. Compared to FIG. 2A, in FIG. 2B, the bar of the histogram of the preceding H (PH) and the bar of the histogram of the preceding L (PL) come close to each other along the vertical axis. The size of the eye opening EO at this time is expressed by the expression EO=P0−(P1−C1)−Δ and is larger than that of the opening EO in the case of FIG. 2A.

FIG. 2C illustrates a histogram in a case of C1=P1. At this time, the bar of the histogram of the preceding H (PH) and the bar of the histogram of the preceding L (PL) are within a range of the same voltage as each other, and the size of the eye opening EO is expressed by the expression EO=P0−Δ.

FIG. 2D illustrates a histogram in a case of C1>P1. Compared to FIGS. 2A and 2B, in FIG. 2D, the high-low relationship between the voltages of the bar of the histogram of the preceding H (PH) and the bar of the histogram of the preceding L (PL) is inverted. The size of the eye opening EO at this time is expressed by the expression EO=P0−(P1−C1)−Δ.

As seen in FIGS. 2A to 2D, when the tap coefficient is set as C1=P1, the size EO of the eye opening becomes the maximum. In the DFE of one tap, the voltage value of the bit at the preceding H (PH) is decreased by C1 and is added to the voltage value of the current bit, and the voltage value of the bit at the preceding L (PL) is increased by C1 and is added to the voltage value of the current bit. In not only a DFE of one tap but also in DFEs of a plurality of taps and equalizers of other types, the eye opening is maximized by adjusting the gain and increasing the minimum level in all the histograms including both the histogram of the preceding H (PH) and the histogram of the preceding L (PL). An equalizer adjustment algorithm such as the SSLMS is used for automatically setting the gain of the equalizer such that the eye opening in the signal waveform of a data array output from the equalizer is maximized.

FIGS. 3A, 3B, 3C, and 3D are views describing equalizer adjustment using sign-sign least mean square (SSLMS).

FIG. 3A illustrates a histogram in a case of C1=0 (or in a case of using no equalizer). FIG. 3B illustrates a histogram in a case of 0<C1<P1, FIG. 3C illustrates a histogram in a case of C1=P1, and FIG. 3D illustrates a histogram in a case of C1>P1.

During equalizer adjustment using SSLMS, information regarding which of the H level and the L level the data of the preceding bit is at and regarding whether or not the voltage value of data V of the current bit output from the equalizer is larger than P0 is used. During a certain period, the ratio of the current bit at the preceding H (PH) with a relationship of V>P0 is indicated as $N_{H+}$ (%), the ratio of the current bit at the preceding H (PH) with a relationship of V<P0 is indicated as $N_{H-}$ (%), the ratio of the current bit at the preceding L (PL) with a relationship of V>P0 is indicated as $N_{L+}$ (%), and the ratio of the current bit at the preceding L (PL) with a relationship of V<P0 is indicated as $N_{L-}$ (%). The numerical values $N_{H+}$, $N_{H-}$, $N_{L+}$, and $N_{L-}$ are indicated within the bars in FIGS. 3A to 3D.

In FIG. 3A, in the case of the preceding L (PL), the value of $N_{L-}$ (%) with a relationship of current V<P0 is 50(%), and in the case of the preceding H (PH), the value of $N_{H+}$ (%) with a relationship of current V>P0 is 50(%).

In FIG. 3B, in the case of the preceding L (PL), the value of $N_{L-}$ (%) with a relationship of current V<P0 is 40(%), and the value of $N_{L+}$ (%) with a relationship of current V>P0 is 10(%). In the case of the preceding H (PH), the value of $N_{H-}$ (%) with a relationship of current V<P0 is 10(%), and the value of $N_{H+}$ (%) with a relationship of current V>P0 is 40(%).

In FIG. 3C, in the case of the preceding L (PL), the value of $N_{L-}$ (%) with a relationship of current V<P0 is 25(%), and the value of $N_{L+}$ (%) with a relationship of current V>P0 is 25(%). In the case of the preceding H (PH), the value of $N_{H-}$ (%) with a relationship of current V<P0 is 25(%), and the value of $N_{H+}$ (%) with a relationship of current V>P0 is 25(%).

In FIG. 3D, in the case of the preceding L (PL), the value of $N_{L-}$ (%) with a relationship of current V<P0 is 20(%), and the value of $N_{L+}$ (%) with a relationship of current V>P0 is 30(%). In the case of the preceding H (PH), the value of $N_{H-}$ (%) with a relationship of current V<P0 is 30(%), and the value of $N_{H+}$ (%) with a relationship of current V>P0 is 20(%).

In equalizer adjustment using SSLMS, $N=(N_{H+}+N_{L-})-(N_{H-}+N_{L+})$ is calculated from the numerical values $N_{H+}$, $N_{H-}$, $N_{L+}$, and $N_{L-}$ obtained during a certain period. In a case of N>0, C1 is increased. In a case of N<0, C1 is decreased. In a case of N=0, C1 is maintained. In FIG. 3A, due to the relationship of N=100, C1 is increased. In FIG. 3B, due to the relationship of N=60, C1 is increased. In FIG. 3C, due to the relationship of N=0, C1 is maintained. In FIG. 3D, due to the relationship of N=−20, C1 is decreased. According to such adjustment, as illustrated in FIG. 3C, C1 of the equalizer is automatically set to P1, and the eye opening in the signal waveform of a data array output from the equalizer is maximized (optimum setting of the equalizer).

The SSLMS which is an equalizer adjustment algorithm in the related art enables an equalizer to have optimum frequency characteristics in a case where a data array has no auto-correlation. However, the SSLMS in the related art cannot enable an equalizer to have optimum frequency characteristics in a case where a data array has an auto-correlation. An auto-correlation of a data array will be described using FIGS. 4 and 5.

Figure 4:
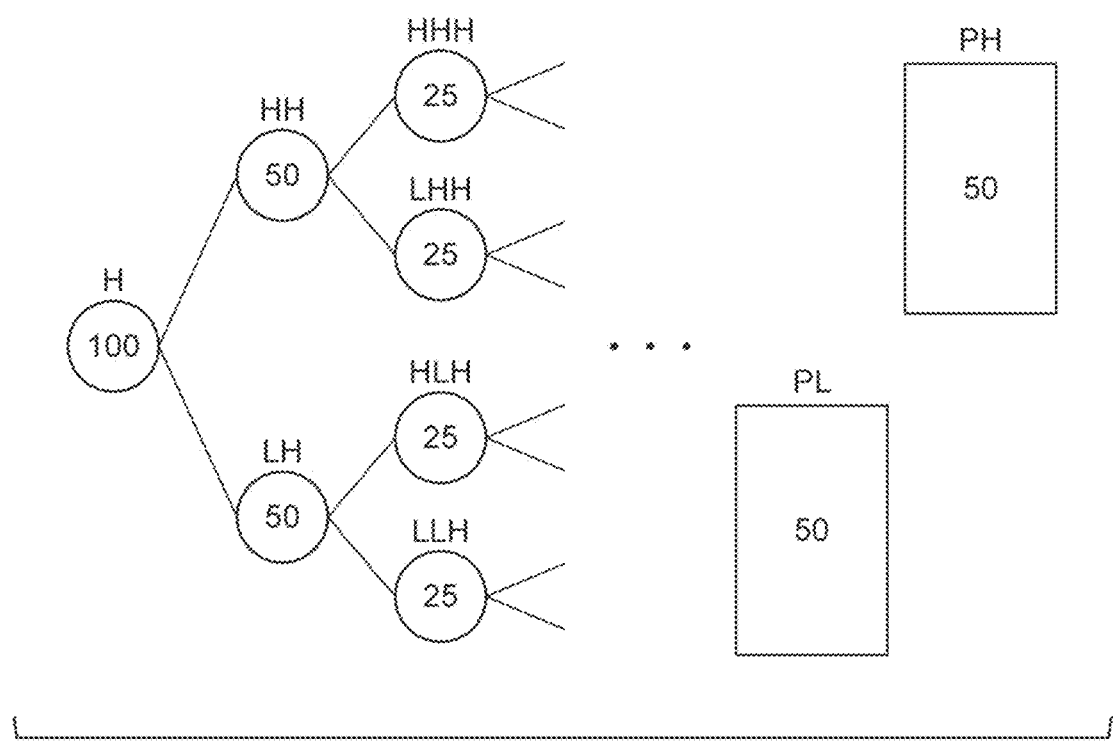
FIG. 4 is a view describing a data array having no auto-correlation.

FIG. 4 is a view describing a data array having no auto-correlation. In a data array having no auto-correlation, regardless of the logical value of the preceding bit, the H level and the L level appear in logical values of the current bit with the same frequencies. That is, even if a certain bit is at either the H level or the L level, the H level or the L level appears in the next bit with the frequency of 50%. The same applies to the succeeding bits. The numbers in the circles on the left in FIG. 4 indicate the probability (%) of occurrence of the state of a case of the data arrays (H or L) indicated on the circles.

In the histogram, the voltage is indicated in the vertical direction, and the frequency of the voltage which becomes a target is indicated as the length of the bar of the histogram in the traverse direction. In this case, in any data array, consequently, as illustrated on the right in FIG. 4, the shapes of the bar of the histogram of the preceding H (PH) and the bar of the histogram of the preceding L (PL) can be expressed in a rectangle.

Figure 5:
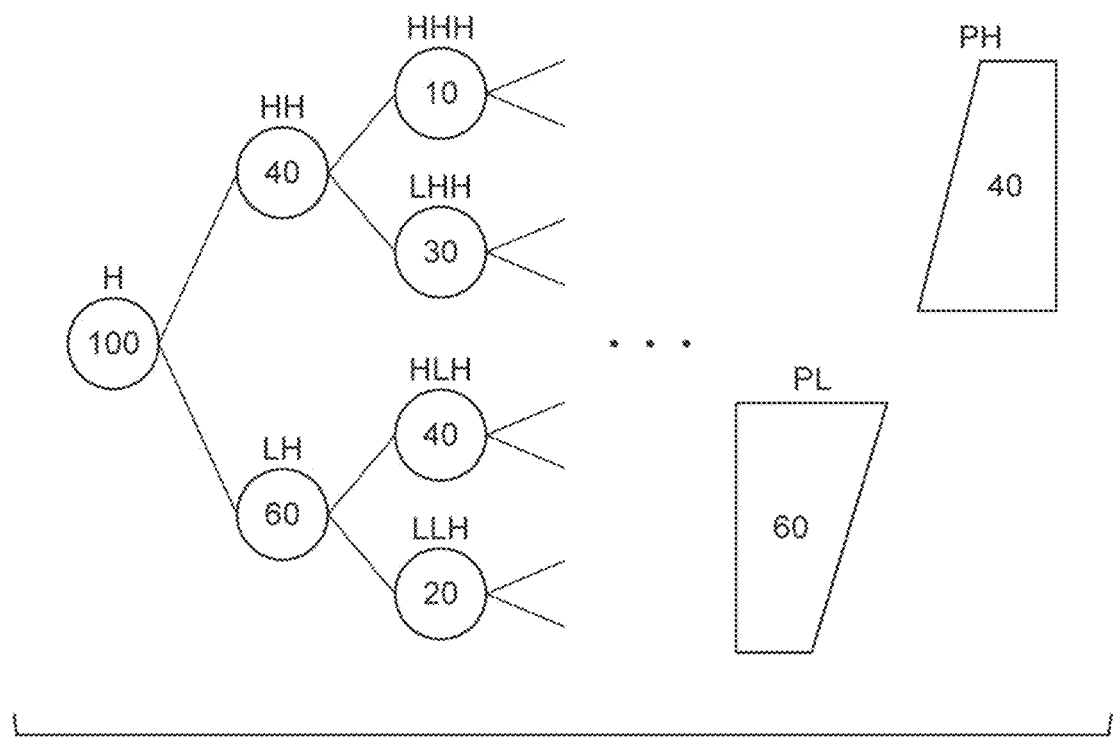
FIG. 5 is a view describing a data array having an auto-correlation.

FIG. 5 is a view describing a data array having an auto-correlation. The displaying method in FIG. 5 is the same as that in FIG. 4. In a data array having an auto-correlation, depending on the logical value of the preceding bit (in addition, depending on the logical value of a further preceding bit), the H level and the L level appear in logical values of the current bit with different frequencies. In the example illustrated in this diagram, when a certain bit is at the H level, the frequency for the H level is 40% and the frequency for the L level is 60% in the next bit. The frequency of the level of the logical value of a further succeeding bit also depends on the history of the levels of the logical values of the bits by that time.

Similar to FIG. 4, when the frequency of the voltage which becomes a target is indicated as the length of the bar of the histogram in the traverse direction, in any data array, consequently, as illustrated on the right in FIG. 5, the shapes of the bar of the histogram of the preceding H and the bar of the histogram of the preceding L can be expressed in a trapezoid. Examples of a data array having an auto-correlation include those in which the logical value of a bit immediately preceding or immediately succeeding a certain bit has a high frequency of being at the L (H) level when the logical value of the bit is at the H (L) level.

FIGS. 6A, 6B, 6C, and 6D are views describing equalizer adjustment using SSLMS in a case where a data array has an auto-correlation.

Figure 6A:
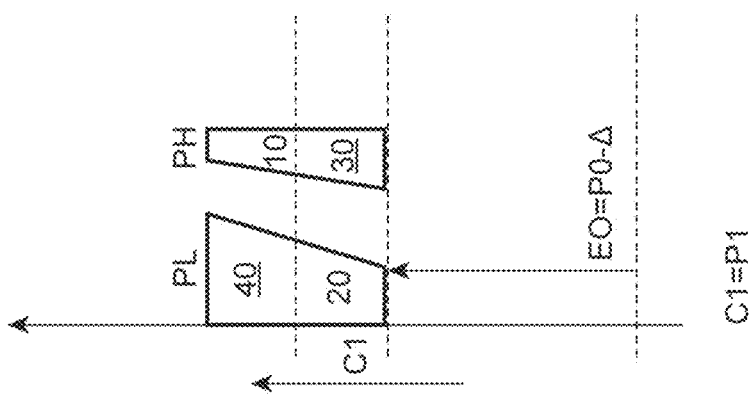
FIGS. 6A, 6B, 6C, and 6D are views describing equalizer adjustment using SSLMS in a case where a data array has an auto-correlation.
Figure 6B:
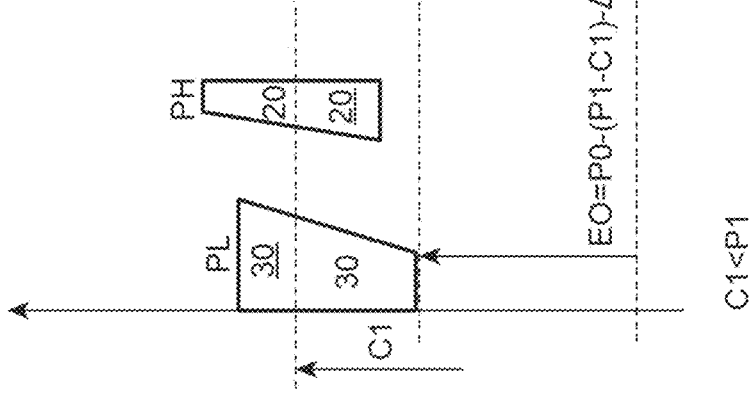

FIG. 6A illustrates a histogram in a case of C1=0 (or in a case of using no equalizer). FIG. 6B illustrates a histogram in a case of 0<C1<P1, FIG. 6C illustrates a histogram in a case of C1=P1, and FIG. 6D illustrates a histogram in a case of C1>P1.

In this diagram, the preceding H (PH) is 40%, and the preceding L (PL) is 60%. When $N=(N_{H+}+N_{L-})-(N_{H-}+N_{L+})$ is calculated from the numerical values $N_{H+}$, $N_{H-}$, $N_{L+}$, and $N_{L-}$, due to the relationship of N=100 in FIG. 6A, C1 is increased. In FIG. 6B, due to the relationship of N=40, C1 is increased. In FIG. 6C, due to the relationship of N=0, C1 is maintained. In FIG. 6D, due to the relationship of N=−40, C1 is decreased.

Figure 6C:
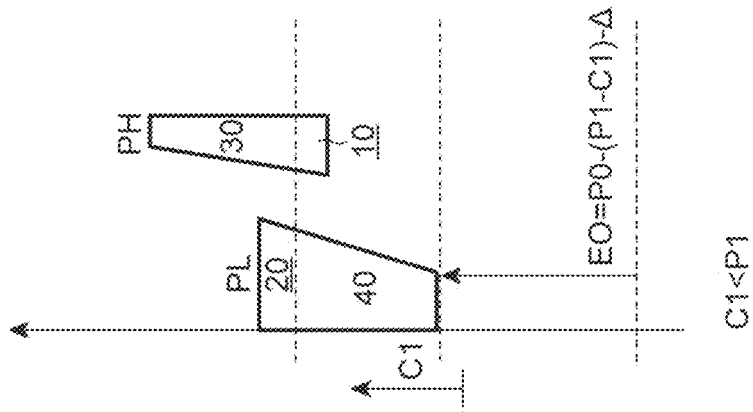
Figure 6D:
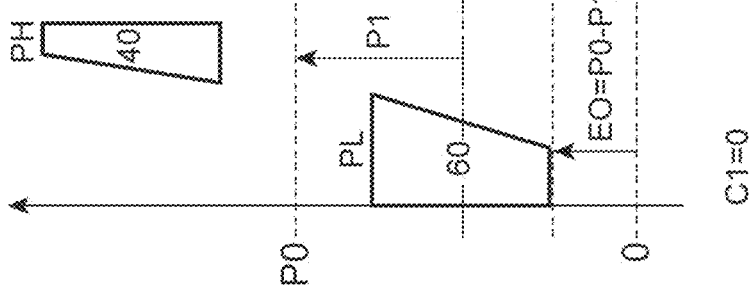

In a case where a data array has an auto-correlation, the equalizer is set to the state as illustrated in FIG. 6C through such adjustment. However, the eye opening EO becomes the maximum not at the time of the state (C1<P1) in FIG. 6C but at the time of the state (C1=P1) in FIG. 6D when the minimum level in the bars of all histograms including both the bar of the histogram of the preceding H (PH) and the bar of the histogram of the preceding L (PL) becomes the maximum (optimum setting of the equalizer). In this manner, in a case where a data array has an auto-correlation, the SSLMS in the related art cannot enable the equalizer to have optimum frequency characteristics, and the eye opening cannot be maximized.

In an actual signal transmitting and receiving system, there are many cases where a data array sent from the transmitter has an auto-correlation. For example, the transmitter sends an encoded data array, and the receiver decodes a received data array. Examples of encoding technologies used at that time include 8b10b. Even if an unencoded data array has no auto-correlation, an encoded data array has an auto-correlation, bits preceding and succeeding the bit at the H level have a high frequency of being at the L level. Therefore, in a case where a data array arriving at the receiver is encoded, the SSLMS in the related art cannot enable the equalizer to have optimum frequency characteristics, and the eye opening cannot be maximized.

The equalizer adjusting device and the equalizer adjusting method of the embodiment described below are based on a new equalizer adjustment algorithm. In the equalizer adjusting device and the equalizer adjusting method of the present embodiment, even in a case where a data array arriving at the receiver is encoded, that is, even in a case where a data array has an auto-correlation, compared to the equalizer adjustment algorithm in the related art, the equalizer can have more favorable frequency characteristics, and the eye opening can be further increased.

Figure 7:
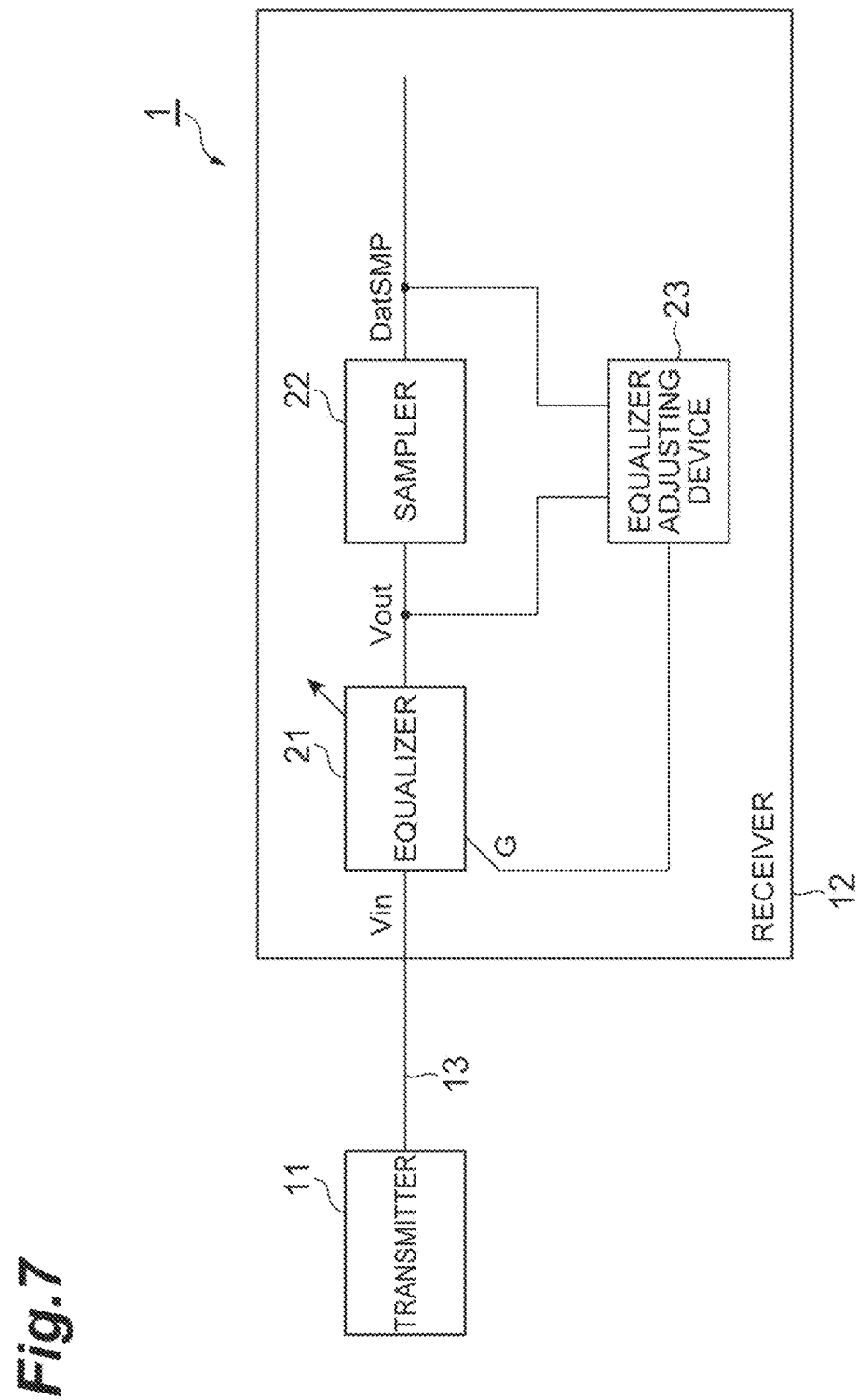
FIG. 7 is a view illustrating a configuration of a signal transmitting and receiving system 1 of the present embodiment.

FIG. 7 is a view illustrating a configuration of a signal transmitting and receiving system 1 of the present embodiment. The signal transmitting and receiving system 1 has a configuration in which a transmitter 11 and a receiver 12 are connected to each other via a transmission path 13. The transmitter 11 outputs a data array to the transmission path 13. The receiver 12 inputs a data array which has been output from the transmitter 11 and has arrived via the transmission path 13.

The receiver 12 includes an equalizer 21, a sampler 22, and an equalizer adjusting device 23. The equalizer 21 inputs a data array Vin which has arrived at the receiver 12, adjusts the frequency characteristics of the input data array, and outputs the adjusted data array to the sampler 22. The sampler 22 inputs a data array output from the equalizer 21, performs magnitude comparison between a voltage value Vout of a bit and a reference value for each bit of the input data array, and outputs a logical value DatSMP according to the result of the comparison. The reference value in the sampler 22 is uniform and is 0 V, for example. The sampler 22 outputs the H level as the logical value DatSMP when the voltage value Vout is larger than the reference value and outputs the L level as the logical value DatSMP when the voltage value Vout is smaller than the reference value. The equalizer adjusting device 23 inputs the voltage value Vout of the data array output from the equalizer 21 and inputs the logical value DatSMP output from the sampler 22, thereby adjusting a gain G of the equalizer 21 based on the voltage value Vout and the logical value DatSMP which have been input.

The transmitter 11 may output an encoded data array. In this case, the receiver 12 decodes the logical value DatSMP output from the sampler 22 and acquires an unencoded data array. In addition, the transmitter 11 may output a data array in which a clock is embedded. In this case, the receiver 12 restores the clock and data by a clock data recovery (CDR) technology.

Figure 8:
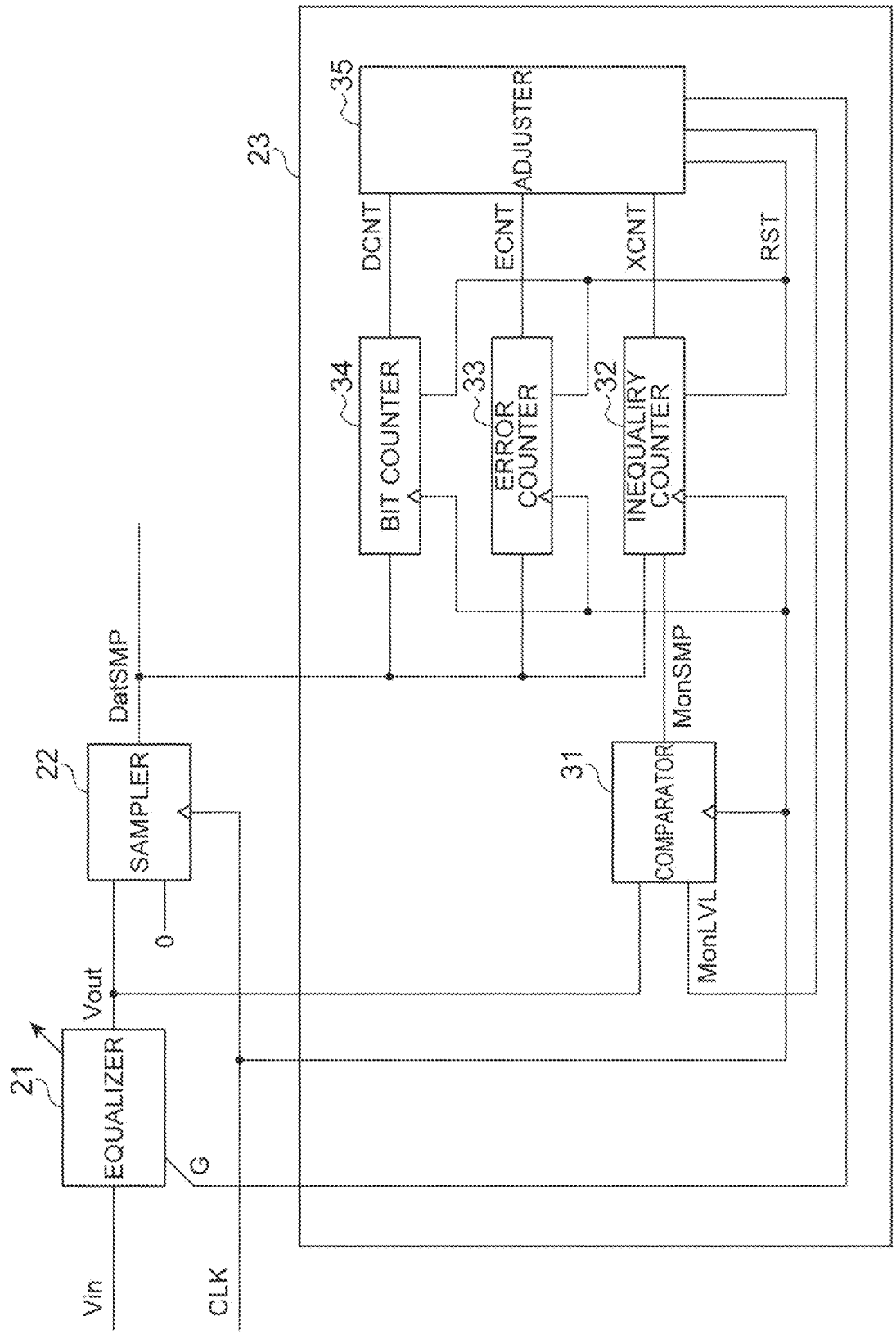
FIG. 8 is a view illustrating a configuration of an equalizer adjusting device 23 of the present embodiment.

FIG. 8 is a view illustrating a configuration of the equalizer adjusting device 23 of the present embodiment. In this diagram, the equalizer 21 and the sampler 22 are also illustrated. The equalizer adjusting device 23 includes a comparator 31, an inequality counter 32, an error counter 33, a bit counter 34, and an adjuster 35.

The comparator 31 performs magnitude comparison between the voltage value Vout of a bit and a threshold value MonLVL for each bit of the data array output from the equalizer 21 and outputs a logical value MonSMP according to the result of the comparison to the inequality counter 32. The comparator 31 outputs the logical value MonSMP as the H level when the voltage value Vout is larger than the threshold value MonLVL and outputs the logical value MonSMP as the L level when the voltage value Vout is smaller than the threshold value MonLVL. The threshold value MonLVL is variable and is set by the adjuster 35.

The bit counter 34 inputs the logical value DatSMP output from the sampler 22 and counts the bits at either the H level or the L level in the logical value DatSMP every period. The bit counter 34 outputs a counted value DCNT to the adjuster 35.

The inequality counter 32 inputs the logical value DatSMP output from the sampler 22 in accordance with the result of magnitude comparison between the voltage value Vout of a bit and the reference value, and the logical value MonSMP output from the comparator 31 in accordance with the result of magnitude comparison between the voltage value Vout of a bit and the threshold value MonLVL for each bit of the data array output from the equalizer 21. The inequality counter 32 counts events in which the logical value DatSMP and the logical value MonSMP differ from each other, every period. The inequality counter 32 outputs a counted value XCNT to the adjuster 35.

In a case where the threshold value MonLVL in the comparator 31 is larger than the reference value in the sampler 22, the inequality counter 32 selectively performs a counting operation in a case where the logical value DatSMP output from the sampler 22 is input when the voltage value Vout of each bit input to the sampler 22 is larger than the reference value. In this case, the bit counter 34 selectively counts the bits of which the logical value DatSMP is at the H level, and the inequality counter 32 counts events in which the logical value DatSMP is at the H level and the logical value MonSMP is at the L level. Hereinafter, this case will be described.

On the contrary, in a case where the threshold value MonLVL in the comparator 31 is smaller than the reference value in the sampler 22, the inequality counter 32 selectively performs a counting operation in a case where the logical value DatSMP output from the sampler 22 is input when the voltage value Vout of each bit input to the sampler 22 is smaller than the reference value. In this case, the bit counter 34 selectively counts the bits of which the logical value DatSMP is at the L level, and the inequality counter 32 counts events in which the logical value DatSMP is at the L level and the logical value MonSMP is at the H level.

The error counter 33 inputs the logical value DatSMP output from the sampler 22 and counts events in which an error is detected in a logical value array, every period. For example, if a data array to be input is encoded, the error counter 33 determines whether or not the data array satisfies the rule of encoding. When the rule is not satisfied, the error counter 33 judges that there is an error in the logical value array. The error counter 33 outputs a counted value ECNT to the adjuster 35. In a case where 8b10b of a high-speed serial transfer method is used, when 1 or 0 of a data array successively appears six times or more, it is possible to judge that there is an error.

The sampler 22 and the comparator 31 perform a magnitude comparison operation at a timing instructed by a clock CLK. The inequality counter 32, the error counter 33, and the bit counter 34 determine whether or not to update the counted value at the timing instructed by the clock CLK. This clock CLK may be a clock restored from an input data array. In each of the inequality counter 32, the error counter 33, and the bit counter 34, the counted value is initialized to 0 at a timing instructed by a reset signal RST applied from the adjuster 35.

The adjuster 35 inputs the counted value XCNT output from the inequality counter 32, the counted value ECNT output from the error counter 33, and the counted value DCNT output from the bit counter 34. The adjuster 35 outputs the reset signal RST for initializing the counted value to 0 in each of the inequality counter 32, the error counter 33, and the bit counter 34, when it is determined that the counted value DCNT has reached a predetermined value DATCNT. The predetermined value DATCNT can be set to an arbitrary value.

The adjuster 35 may output the reset signal RST for initializing at a uniform time interval regardless of the counted value DCNT. In this case, the bit counter 34 does not have to be provided. The adjuster 35 performs processing as follows based on the counted value XCNT of the inequality counter 32 and the counted value ECNT of the error counter 33 during a period from a preceding initialization timing to the current initialization timing.

When the counted value XCNT is zero, the adjuster 35 adjusts the threshold value MonLVL in the comparator 31 in a direction (that is, in the positive direction) in which the difference between the threshold value MonLVL and the reference value in the sampler 22 increases. The adjustment amount of this threshold value MonLVL may be a uniform value. On the contrary, when the counted value XCNT is not zero, the adjuster 35 adjusts the gain G of the equalizer 21 based on the counted value XCNT and the counted value ECNT. The adjustment amount of this gain G may also be a uniform value.

In a signal transmitting and receiving system in which a state where there is no error in the logical value array output from the sampler 22 (that is, a state of counted value ECNT=0) continues, there is no need for the adjuster 35 to consider the counted value ECNT, and the error counter 33 does not have to be provided.

In the equalizer adjusting device 23 of the present embodiment, the equalizer 21 can have more favorable frequency characteristics and the eye opening can be further increased by performing a counting operation of the inequality counter 32 (and the error counter 33) and an adjusting operation of the adjuster 35 every period.

In addition, in the equalizer adjusting method of the present embodiment, the equalizer 21 can have more favorable frequency characteristics and the eye opening can be further increased by performing a counting step and an adjusting step every period. In the counting step, the inequality counter 32 and the like perform the counting operation described above. In the adjusting step, the adjuster 35 performs the adjusting operation described above, based on each of the counted values.

That is, in the counting step, the bit counter 34 counts the bits at either the H level or the L level in the logical value DatSMP output from the sampler 22 every period. The inequality counter 32 counts events in which the logical value DatSMP output from the sampler 22 and the logical value MonSMP output from the comparator 31 differ from each other, every period. In addition, the error counter 33 counts events in which an error is detected in a logical value array output from the sampler 22, every period.

In the adjusting step, the adjuster 35 performs an adjusting operation based on the counted value XCNT output from the inequality counter 32, the counted value ECNT output from the error counter 33, and the counted value DCNT output from the bit counter 34. When the counted value XCNT is zero, the adjuster 35 adjusts the threshold value MonLVL in the comparator 31 in a direction (that is, in the positive direction) in which the difference between the threshold value MonLVL and the reference value in the sampler 22 increases. On the contrary, when the counted value XCNT is not zero, the adjuster 35 adjusts the gain G of the equalizer 21 based on the counted value XCNT and the counted value ECNT.

Figure 9:
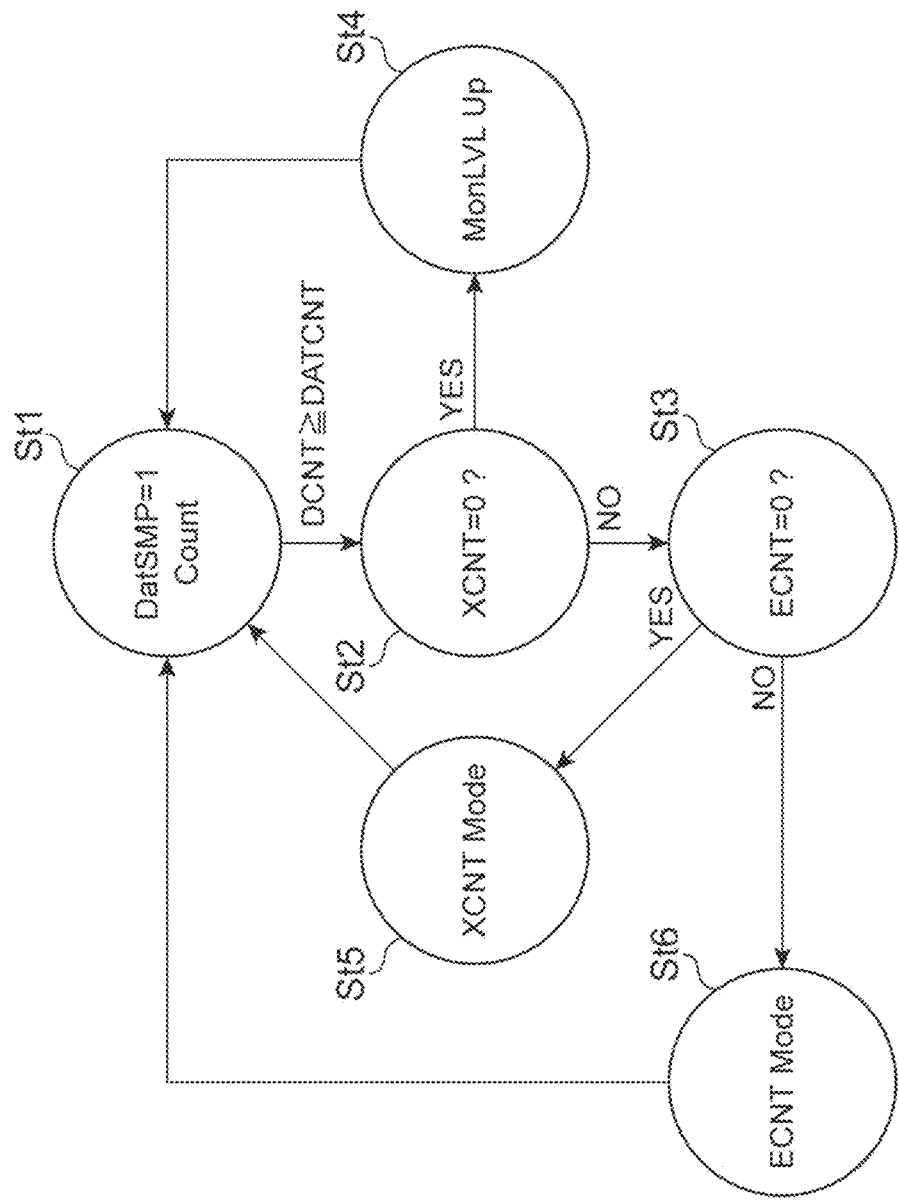
FIG. 9 is a view describing an adjuster 35 in the present embodiment and processing details of an adjusting step using a state machine.

FIG. 9 is a view describing the adjuster 35 in the present embodiment and processing details of the adjusting step using a state machine. Processing of the adjusting step performed by the adjuster 35 has States St1 to St6.

When the processing shifts from any of other States St4 to St6 to State St1, the adjuster 35 first outputs the reset signal RST for initializing the counted value of each of the inequality counter 32, the error counter 33, and the bit counter 34 to 0. In State St1, thereafter, the counted value XCNT output from the inequality counter 32, the counted value ECNT output from the error counter 33, and the counted value DCNT output from the bit counter 34 are input. The adjuster 35 determines whether or not the counted value DCNT has reached the predetermined value DATCNT. The processing stays in State St1 until the counted value DCNT reaches the predetermined value DATCNT. When the counted value DCNT reaches the predetermined value DATCNT, the processing shifts from State St1 to State St2 while holding the counted value XCNT and the counted value ECNT at that time.

In State St2, the adjuster 35 judges whether or not the counted value XCNT of the inequality counter 32 is zero. In a case where the counted value XCNT is zero, the processing shifts from State St2 to State St4. In a case where the counted value XCNT is not zero, the processing shifts from State St2 to State St3.

In State St3, the adjuster 35 judges whether or not the counted value ECNT of the error counter 33 is zero. In a case where the counted value ECNT is zero, the processing shifts from State St3 to State St5. In a case where the counted value ECNT is not zero, the processing shifts from State St3 to State St6.

State St4 is a state to which the processing shifts at the time of XCNT=0. In State St4, the adjuster 35 adjusts the threshold value MonLVL in the comparator 31 in a direction (that is, in the positive direction) in which the difference between the threshold value MonLVL and the reference value in the sampler 22 increases. The adjuster 35 applies the adjusted threshold value MonLVL to the comparator 31. Thereafter, the processing returns to State St1.

State St5 is a state to which the processing shifts at the time of XCNT≠0 and ECNT=0. In State St5, the adjuster 35 adjusts the gain G of the equalizer 21 in a direction in which the counted value XCNT is decreased. That is, if the current counted value XCNT has decreased to be smaller than the preceding counted value XCNT, the adjustment direction of the gain G of the equalizer 21 is maintained as in the preceding counted value. If the current counted value XCNT has increased to be larger than the preceding counted value XCNT, the adjustment direction of the gain G of the equalizer 21 is inverted. However, as an exception, in a case where the preceding counted value XCNT is zero (that is, in a case where the threshold value MonLVL is updated in State St3 regarding the preceding counted value), or in a case where the preceding counted value ECNT is not zero (that is, in a case where the gain G is updated in State St6 regarding the preceding counted value), the adjustment direction of the gain G of the equalizer 21 is maintained as in the preceding counted value regardless of increase and decrease in the counted value XCNT. Thereafter, the processing returns to State St1.

State St6 is a state to which the processing shifts at the time of XCNT≠0 and ECNT≠0. In State St6, the adjuster 35 adjusts the gain G of the equalizer 21 in a direction in which the counted value ECNT is decreased. That is, if the current counted value ECNT has decreased to be smaller than the preceding counted value ECNT, the adjustment direction of the gain G of the equalizer 21 is maintained as in the preceding counted value. If the current counted value ECNT has increased to be larger than the preceding counted value ECNT, the adjustment direction of the gain G of the equalizer 21 is inverted. However, as an exception, in a case where the preceding counted value ECNT is zero (that is, in a case where the gain G is updated in State St5 regarding the preceding counted value), the adjustment direction of the gain G of the equalizer 21 is maintained as in the preceding counted value regardless of increase and decrease in the counted value ECNT. Thereafter, the processing returns to State St1.

FIGS. 10A, 10B, 10C, and 10D are views describing equalizer adjustment performed by the equalizer adjusting device or the equalizer adjusting method of the present embodiment. These diagrams illustrate the threshold value MonLVL in the comparator 31, in addition to the histogram of the preceding H (PH) and the histogram of the preceding L (PL) during each period. In these diagrams, the counted value ECNT is zero at all times. In addition, a DFE of one tap is postulated as the equalizer, and the tap coefficient is indicated as C1. The tap coefficient denotes a gain in the equalizer.

In FIG. 10A, a part (20%) of the bar of the histogram of the preceding L (PL) is within a range smaller than the threshold value MonLVL. The counted value XCNT is not zero. Here, during the next period (FIG. 10B), the threshold value MonLVL is maintained, and C1 is increased.

In FIG. 10B as well, a part (10%) of the bar of the histogram of the preceding L (PL) is within a range smaller than the threshold value MonLVL. Although the counted value XCNT has decreased to be smaller than the preceding counted value, it is not zero. Here, during the next period (FIG. 10C), the threshold value MonLVL is maintained, and C1 is further increased.

In FIG. 10C as well, a part (5%) the bar of the histogram of the preceding L (PL) is within a range smaller than the threshold value MonLVL. Although the counted value XCNT has decreased to be smaller than the preceding counted value, it is not zero. Here, during the next period (FIG. 10D), the threshold value MonLVL is maintained, and C1 is further increased.

In FIG. 10D, the bars of all histograms including both the histogram of the preceding L (PL) and the histogram of the preceding H (PH) are within a range larger than the threshold value MonLVL, and the counted value XCNT is zero. Here, during the next period, the threshold value MonLVL is increased, and C1 is maintained.

The eye opening EO is gradually increased by adjusting the threshold value MonLVL or C1 in this manner. As a method for adjusting the equalizer in a direction in which the counted value XCNT is decreased, an optimization algorithm can be applied for general optimization problems. As an example thereof, a gradient descent method can be applied for the optimization problems. The adjuster 35 in FIG. 8 can adjust the threshold value MonLVL in the comparator 31 and the gain G (tap coefficient C1) in the equalizer 21.

In the equalizer adjustment algorithm of the present embodiment, the threshold value MonLVL in the comparator 31 is dynamically updated. The timing of updating the threshold value MonLVL is the time when the counted value XCNT becomes zero. At this time, the threshold value MonLVL is increased to maintain a relationship of the threshold value MonLVL larger than the eye opening EO. Thereafter, again, the gain of the equalizer is adjusted to reduce the counted value XCNT. These procedures conform to the idea that the equalizer is adjusted to obtain the maximum eye opening EO by causing the threshold value MonLVL to be larger than the eye opening EO at all times in the process of adjusting the equalizer.

Figure 11A:
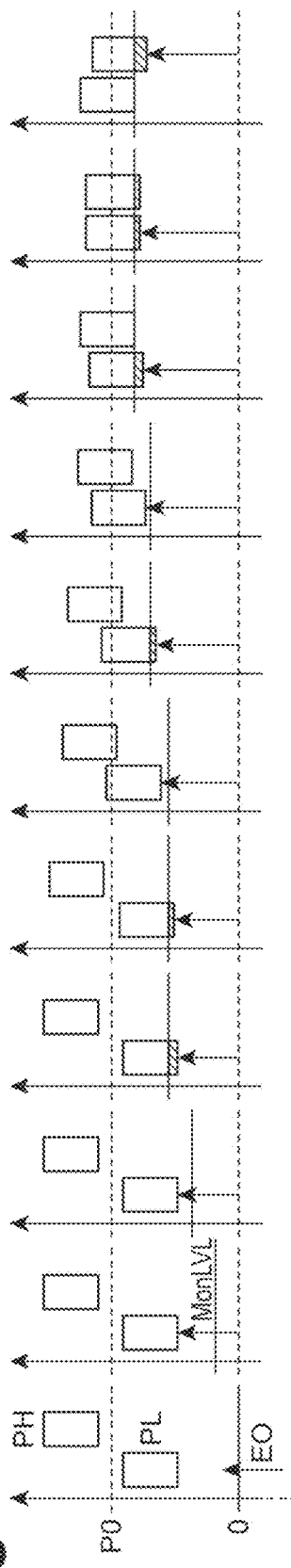
FIGS. 11A, 11B, and 11C are views describing equalizer adjustment performed by the equalizer adjusting device or the equalizer adjusting method of the present embodiment.
Figure 11B:
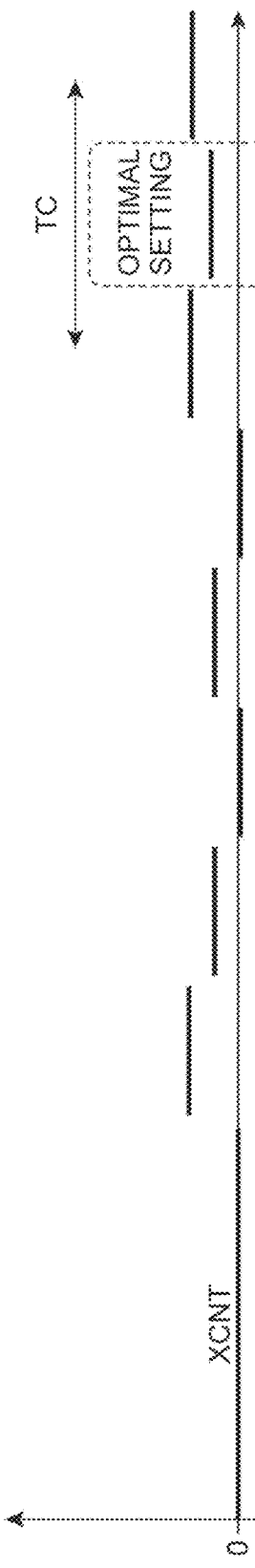
Figure 11C:
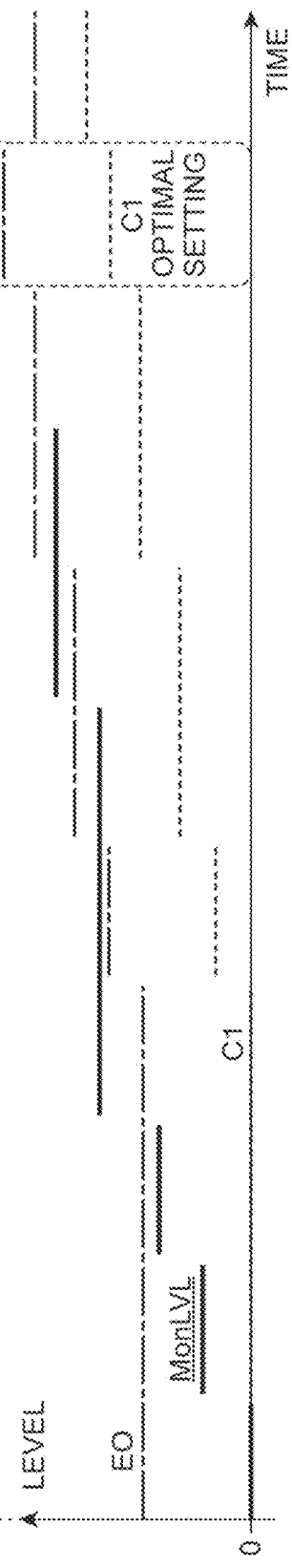

FIGS. 11A, 11B, and 11C are views describing equalizer adjustment performed by the equalizer adjusting device or the equalizer adjusting method of the present embodiment. These diagrams illustrate the counted value XCNT (FIG. 11B), the threshold value MonLVL (FIG. 11C), the eye opening EO (FIG. 11A), and the tap coefficient C1 (FIG. 11C) during each period, in addition to the histogram of the preceding H (PH) and the histogram of the preceding L (PL) (FIG. 11A) during each period. In these diagrams, the counted value ECNT is zero at all times.

As illustrated in these diagrams, when the counted value XCNT during a certain period is zero, the threshold value MonLVL is increased during the next period. When the counted value XCNT during a certain period is not zero, C1 is increased during the next period. The difference between a lower limit value for the voltage value of the histogram of the preceding L (PL) and a lower limit value for the voltage value of the histogram of the preceding H (PH) is gradually decreased and the eye opening EO is gradually increased by adjusting the threshold value MonLVL or C1 in this manner.

However, when there is almost no difference between the lower limit value for the voltage value of the histogram of the preceding L (PL) and the lower limit value for the voltage value of the histogram of the preceding H (PH), and when the eye opening EO comes close to the maximum value, the counted value XCNT repetitively increases and decreases with the lapse of the period. At this time, regarding a certain threshold value MonLVL, the counted value XCNT becomes minute, and the eye opening EO becomes the maximum. C1 at this time is set as an optimum setting value for the equalizer.

The counted value XCNT is converged through reciprocating motion in a section TC in FIG. 11B such that the eye opening EO becomes the maximum.

FIGS. 12A, 12B, 12C, and 12D are views describing equalizer adjustment performed by the equalizer adjusting device or the equalizer adjusting method of the present embodiment in a case where a data array has an auto-correlation. FIG. 12A illustrates a case of C1=0 (same as the case of using no equalizer), FIG. 12B illustrates a case of C1<P1, FIG. 12C illustrates a case of C1<P1, and FIG. 12D illustrates a case of C1<P1. As illustrated in these diagrams, even in a case where a data array has an auto-correlation, similar to FIGS. 10A to 10D and 11A to 11C, when the counted value XCNT during a certain period is zero, the threshold value MonLVL during the next period is increased. When the counted value XCNT during a certain period is not zero, the eye opening EO is gradually increased by increasing C1 during the next period.

In FIG. 12A, a part (approximately 20%) of the bar of the histogram of the preceding L (PL) is within a range smaller than the threshold value MonLVL. The counted value XCNT is not zero. Here, during the next period (FIG. 12B), the threshold value MonLVL is maintained, and C1 is increased.

In FIG. 12B as well, a part (approximately 10%) of the bar of the histogram of the preceding L (PL) is within a range smaller than the threshold value MonLVL. Although the counted value XCNT has decreased to be smaller than the preceding counted value, it is not zero. Here, during the next period (FIG. 12C), the threshold value MonLVL is maintained, and C1 is further increased.

In FIG. 12C as well, a part (approximately 5%) of the bar of the histogram of the preceding L (PL) is within a range smaller than the threshold value MonLVL. Although the counted value XCNT has decreased to be smaller than the preceding counted value, it is not zero. Here, during the next period (FIG. 12D), the threshold value MonLVL is maintained, and C1 is further increased.

In FIG. 12D, the bars of all histograms including both the histogram of the preceding L (PL) and the histogram of the preceding H (PH) are within a range larger than the threshold value MonLVL, and the counted value XCNT is zero. Here, during the next period, the threshold value MonLVL is increased, and C1 is maintained.

When there is almost no difference between the lower limit value for the histogram of the preceding L and the lower limit value for the histogram of the preceding H, and when the eye opening EO comes close to the maximum value, the counted value XCNT repetitively increases and decreases with the lapse of the period. At this time, regarding a certain threshold value MonLVL, the counted value XCNT becomes minute, and the eye opening EO becomes the maximum. C1 at this time is set as an optimum setting value for the equalizer.

The equalizer adjustment algorithm of the present embodiment can be applied to not only a DFE of one tap which has been postulated in the foregoing description but can also be applied to DFEs of a plurality of taps. In addition, it can also be applied to equalizers of other types (for example, CTLE). In a case where the equalizer adjustment algorithm of the present embodiment is applied to DFE of a plurality of taps, the foregoing processing is executed for each tap. At this time, it is preferable to execute processing in order from taps in the lower level. In addition, there are cases DFEs and CTLEs are provided in series. However, in this case, it is preferable to adjust the DFEs after adjusting the CLTEs through the equalizer adjustment algorithm of the present embodiment.

In the SSLMS in the related art, a mean square error has been used as an evaluation function. In contrast, the equalizer adjustment algorithm of the present embodiment maximizes the eye opening EO by using the counted value XCNT as the evaluation function and using the counted value ECNT as the evaluation function at the time of an error. The equalizer adjustment algorithm of the present embodiment can maximize the eye opening EO by decreasing the counted value XCNT, regardless whether or not a data array has an auto-correlation.

In the equalizer adjustment algorithm of the present embodiment, there is no need to input a particular training pattern to the equalizer. In addition, in a case where the eye opening can be ensured to a certain degree in initial setting of the equalizer, there is no need to adjust the equalizer based on the counted value ECNT, and the equalizer can be adjusted based on only the counted value XCNT.

Figure 13A:
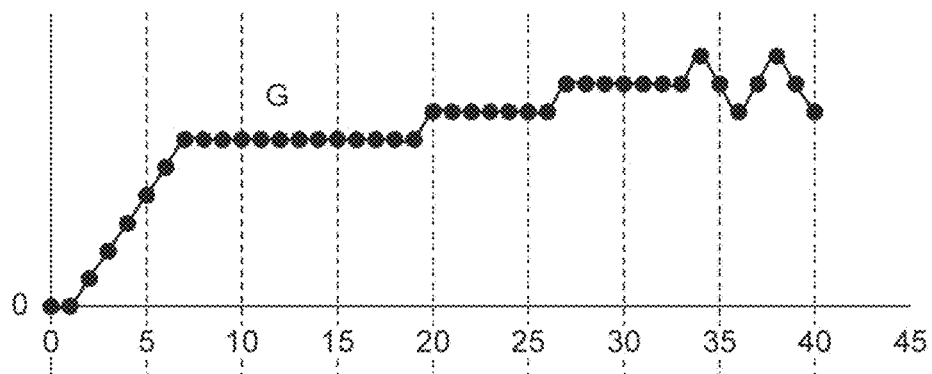
FIGS. 13A, 13B, 13C, and 13D are graphs showing simulation results.
Figure 13B:
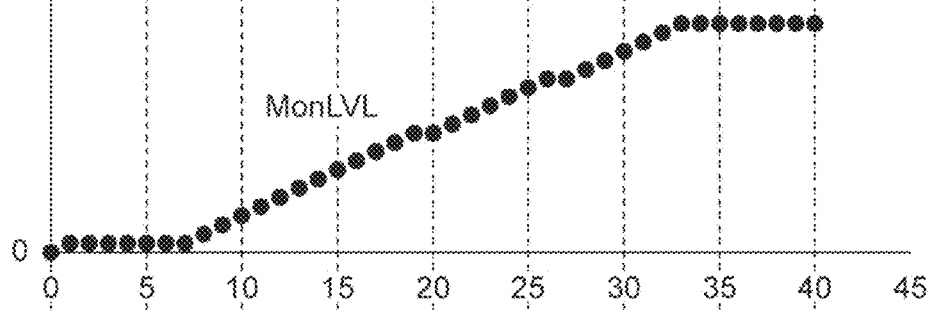
Figure 13C:
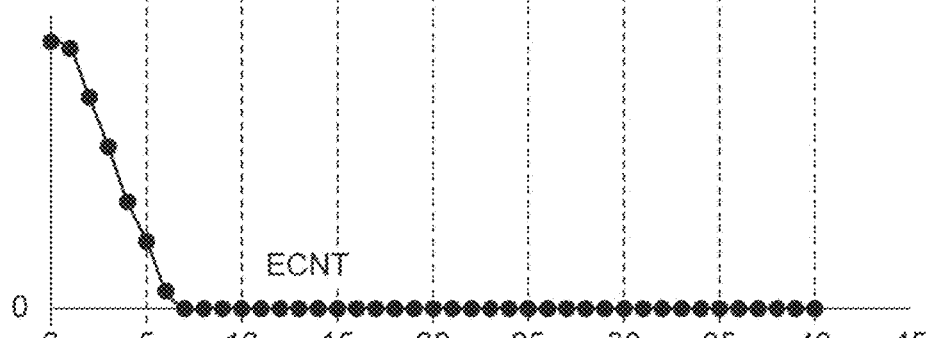
Figure 13D:
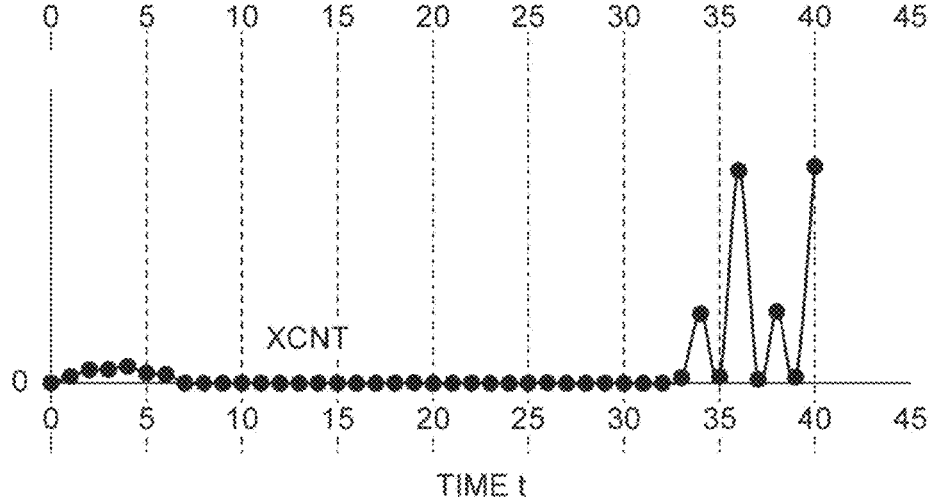
Figure 14:
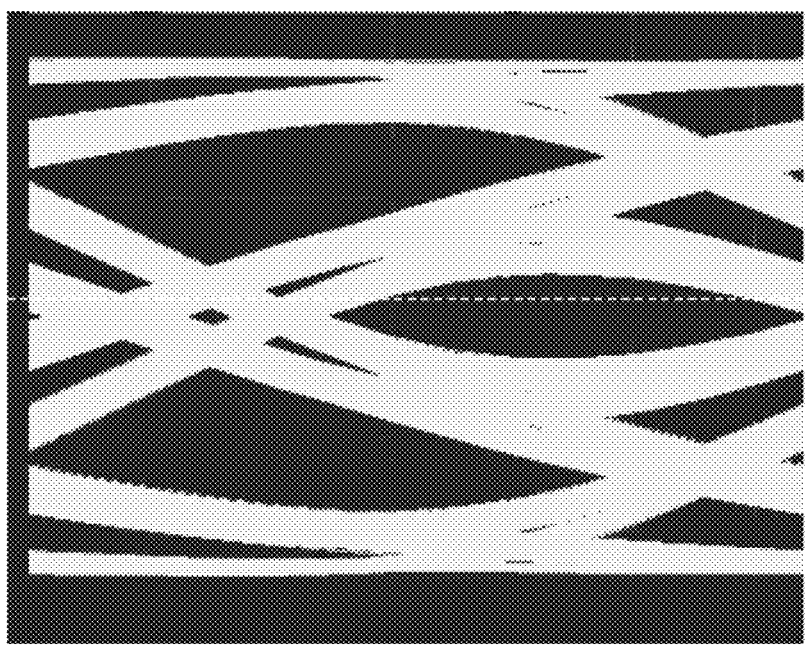
FIG. 14 is a view illustrating an eye pattern of a signal waveform of a data array output from the equalizer (G=12) in a simulation.
Figure 15:
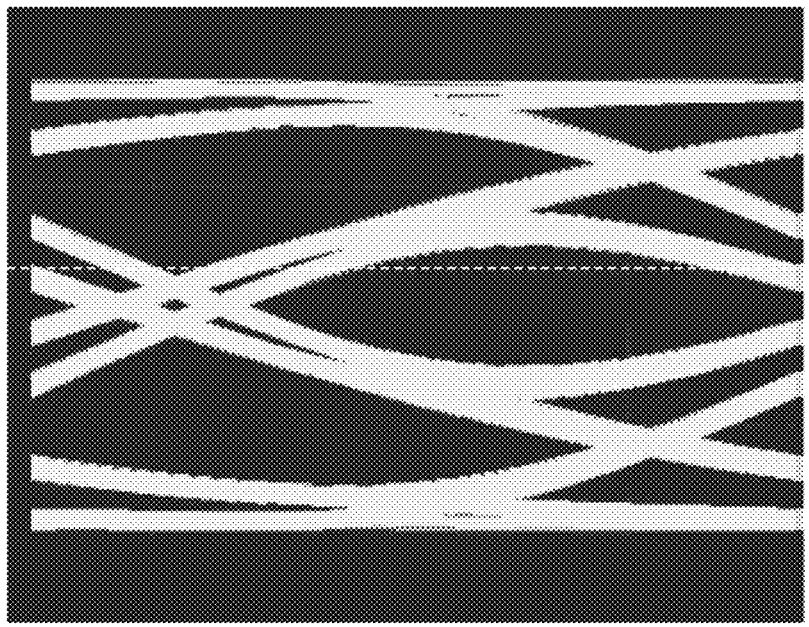
FIG. 15 is a view illustrating an eye pattern of a signal waveform of a data array output from the equalizer (G=14) in a simulation.
Figure 16:
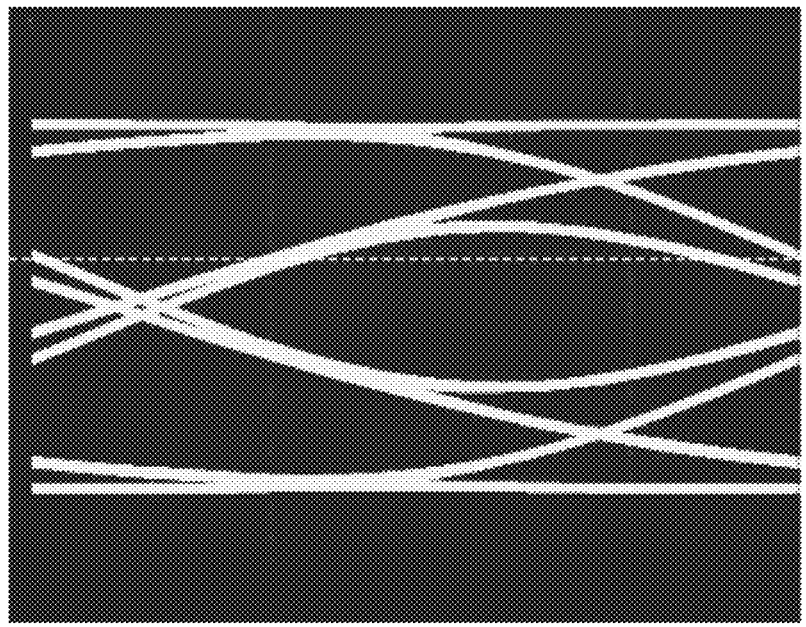
FIG. 16 is a view illustrating an eye pattern of a signal waveform of a data array output from the equalizer (G=16) in a simulation.
Figure 17:
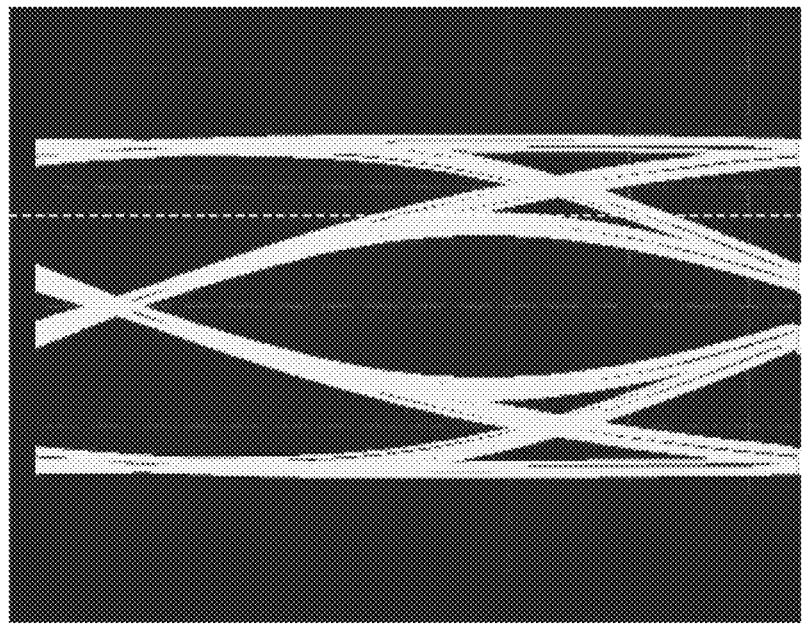
FIG. 17 is a view illustrating an eye pattern of a signal waveform of a data array output from the equalizer (G=18) in a simulation.

Next, results of simulations performed regarding the equalizer adjustment algorithm of the present embodiment will be described. In the present simulations, a CTLE is postulated as the equalizer. FIGS. 13A, 13B, 13C, and 13D are graphs showing simulation results. The graphs illustrate a change over time in each of the DC gain G of the equalizer (FIG. 13A), the threshold value MonLVL in the comparator 31 (FIG. 13B), the counted value ECNT of the error counter 33 (FIG. 13C), and the counted value XCNT of the inequality counter 32 (FIG. 13D). The numerical values of the gain G and the threshold value MonLVL are arbitrary units. The horizontal axis indicates a time t having the time of each period as the unit. FIGS. 14 to 17 are views illustrating eye patterns of signal waveforms of data arrays output from the equalizer in simulations.

In t=0, G=0, MonLVL=0, XCNT≠0, and ECNT≠0 are set. Due to XCNT≠0, the MonLVL is increased during the next period.

In t=1, G=0, MonLVL=1, XCNT≠0, and ECNT≠0 are set. Due to XCNT≠0, the G is increased during the next period. A change direction when the G is changed for the first time is decided in advance. When the ECNT decreases thereafter, the change direction of the G is maintained. On the contrary, when the ECNT increases thereafter, the change direction of the G is inverted.

In t=2 to 6, MonLVL=1, XCNT≠0, and ECNT≠0 are set. Due to XCNT≠0 and the decreased ECNT, the change direction of the G is maintained, and the G is gradually increased.

In t=7 (FIG. 14), G=12, MonLVL=1, XCNT=0, and ECNT=0 are set. The eye opening starts to open. Due to XCNT=0, the MonLVL is increased during the next period.

In t=8 to 18, G=12, XCNT=0, and ECNT=0 are set. Due to XCNT≠0, the MonLVL is gradually increased.

In t=19, G=12, MonLVL=13, XCNT≠0, and ECNT=0 are set. Due to XCNT≠0, the G is increased during the next period.

In t=20 (FIG. 15), G=14, MonLVL=13, XCNT=0, and ECNT=0 are set. Due to XCNT=0, the MonLVL is increased during the next period.

In t=21 to 25, G=14, XCNT=0, and ECNT=0 are set. Due to XCNT=0, the MonLVL is gradually increased.

In t=26, G=14, MonLVL=19, XCNT≠0, and ECNT=0 are set. Due to XCNT≠0, the G is increased during the next period.

In t=27 (FIG. 16), G=16, MonLVL=19, XCNT=0, and ECNT=0 are set. Due to XCNT=0, the MonLVL is increased during the next period.

In t=28 to 32, G=16, XCNT=0, and ECNT=0 are set. Due to XCNT=0, the MonLVL is gradually increased.

In t=33, G=16, MonLVL=25, XCNT≠0, and ECNT=0 are set. Due to XCNT≠0, the G is increased during the next period.

In t=34 (FIG. 17), G=18, MonLVL=25, XCNT≠0, and ECNT=0 are set. The XCNT becomes larger than that in the preceding counted value, and the eye opening which has increased and decreased continuously switches to decreasing. Since the XCNT becomes larger than that in the preceding counted value, the change direction of the G is inverted, and the G during the next period is decreased.

In t=35, G=16, MonLVL=25, XCNT≠0, and ECNT=0 are set. Since the XCNT becomes smaller than that in the preceding counted value, the change direction of the G is maintained, and the G is decreased during the next period as well.

In t=36, G=14, MonLVL=25, XCNT≠0, and ECNT=0 are set. Since the XCNT becomes larger than that in the preceding counted value, the change direction of the G is inverted, and the G is increased during the next period.

Thereafter, the G and the XCNT repetitively increase and decrease with the lapse of time. Since the XCNT becomes minute at the time of G=16, G=16 is set as an optimum setting value for the gain of the equalizer.

As described above, in the present embodiment, regardless whether a data array has an auto-correlation, the equalizer can have favorable frequency characteristics and the eye opening EO can be maximized by decreasing the counted value XCNT.

As described above, the foregoing receiver 12 includes the equalizer 21, the sampler 22, the comparator 31, the inequality counter 32, and the adjuster 35.

The equalizer 21 includes an input terminal (a terminal to which Vin in FIG. 8 is input), an output terminal (a terminal indicated by Vout in FIG. 8), and a gain adjustment terminal (a terminal to which the gain G in FIG. 8 is input). In FIGS. 7 and 8, the equalizer 21 can function as a DFE, and the equalizer adjusting device 23 can function as an adjusting device for this DFE. The equalizer 21 is a device adjusting a gain of each of a plurality of frequency bands. In a case where an input signal is a square wave, the contour of the edge becomes clear by raising the gain of the edge part, that is, a high-frequency band in the frequency bands in which the gain is included. As a method for adjusting the gain, it is conceivable to use a method for adjusting gains of the entire frequency bands and a method for adjusting a gain of a high-frequency band.

The sampler 22 includes a first input terminal connected to the output terminal of the equalizer 21, and a second input terminal to which a first reference value (in FIG. 8, since 0 V is input as an example, "zero" is indicated) is input. The timing of sampling is synchronized with the clock CLK, and the sampler 22 of the present example also functions as a comparator.

The comparator 31 includes a first input terminal connected to the output terminal (the terminal for the Vout in FIG. 8) of the equalizer 21, and a second input terminal to which a second reference value (the threshold value MonLVL) is input.

The inequality counter 32 includes a first input terminal connected to the output terminal (the terminal to which the DatSMP is output) of the sampler 22, and a second input terminal connected to the output terminal (the terminal to which the logical value MonSMP is output) of the comparator 31.

The adjuster 35 includes an input terminal connected to the output terminal (the terminal to which the counted value XCNT is output) of the inequality counter 32, a first output terminal connected to the gain adjustment terminal (the terminal for adjusting the gain G of the equalizer 21), and a second output terminal connected to the second input terminal (the terminal to which the threshold value MonLVL is input) of the comparator 31. The adjuster 35 is a gain adjuster for adjusting the gain of the equalizer 21 and is also a reference value adjuster for adjusting the second reference value (the threshold value MonLVL) of the comparator 31. The adjuster performs the foregoing feedback processing in accordance with an input digital signal and can be constituted of a logical circuit or a micro-processor, and software for performing the operations described above.

The sampler 22 and the equalizer adjusting device 23 (particularly, the comparator 31) perform sampling (tapping) of a part of the output signal Vout, and the equalizer adjusting device 23 applies the feedback gain G to the input signal Vin processed by the equalizer 21 in accordance with these sampled values. Before performing the feedback processing with respect to the equalizer 21, the equalizer adjusting device 23 maximizes the opening of the eye pattern (refer to FIG. 11A) by performing processing of raising one judgement threshold value MonLVL and processing of fixing the threshold value MonLVL and adjusting the gain G in accordance with these sampled values.

What is claimed is:

1. An equalizer adjusting device adjusting a gain of an equalizer that adjusts frequency characteristics of an input data array and outputs the adjusted data array to a sampler, the device comprising:
    a comparator which outputs a logical value according to a result of magnitude comparison between a voltage value of a bit and a threshold value for each bit of the data array output from the equalizer;
    an inequality counter which counts events in which a logical value output from the sampler in accordance with the result of magnitude comparison between the voltage value of the bit and a reference value, and the logical value output from the comparator differ from each other, every period for each bit of the data array output from the equalizer; and
    an adjuster which adjusts the threshold value in the comparator in a direction in which a difference between the threshold value and the reference value in the sampler increases when a counted value of the inequality counter is zero, and adjusts the gain of the equalizer when the counted value of the inequality counter is not zero,
    wherein a counting operation of the inequality counter and an adjusting operation of the adjuster are performed every period.

2. The equalizer adjusting device according to claim 1, further comprising:
    an error counter which counts events in which an error is detected in a logical value array output from the sampler, every period,
    wherein the adjuster adjusts the gain of the equalizer based on the counted value of the inequality counter and a counted value of the error counter.

3. The equalizer adjusting device according to claim 1, wherein the threshold value in the comparator is larger than the reference value in the sampler, and
    wherein the inequality counter selectively performs the counting operation in a case where the logical value output from the sampler is input when the voltage value of each bit input to the sampler is larger than the reference value.

4. The equalizer adjusting device according to claim 2, wherein the threshold value in the comparator is larger than the reference value in the sampler, and
    wherein the inequality counter selectively performs the counting operation in a case where the logical value output from the sampler is input when the voltage value of each bit input to the sampler is larger than the reference value.

5. The equalizer adjusting device according to claim 1, wherein the threshold value in the comparator is smaller than the reference value in the sampler, and
    wherein the inequality counter selectively performs the counting operation in a case where the logical value output from the sampler is input when the voltage value of each bit input to the sampler is smaller than the reference value.

6. The equalizer adjusting device according to claim 2, wherein the threshold value in the comparator is smaller than the reference value in the sampler, and
    wherein the inequality counter selectively performs the counting operation in a case where the logical value output from the sampler is input when the voltage value of each bit input to the sampler is smaller than the reference value.

7. A receiver comprising:
    the equalizer which adjusts frequency characteristics of the input data array and outputs the adjusted data array;
    the sampler which outputs the logical value according to the result of magnitude comparison between the voltage value of the bit and the reference value for each bit of the data array output from the equalizer; and
    the equalizer adjusting device according to claim 1 adjusting the gain of the equalizer based on the data array output from the equalizer and the logical value array output from the sampler.

8. A signal transmitting and receiving system comprising:
    a transmitter which outputs a data array; and
    the receiver according to claim 7 to which the data array that has been output from the transmitter and has arrived via a transmission path is input.

9. An equalizer adjusting method for adjusting a gain of an equalizer that adjusts frequency characteristics of an input data array and outputs the adjusted data array to a sampler, the method comprising:
    a counting step for an inequality counter counting events in which a logical value output from the sampler in accordance with a result of magnitude comparison between a voltage value of a bit and a reference value, and a logical value output from a comparator in accordance with a result of magnitude comparison between the voltage value of the bit and a threshold value differ from each other, every period for each bit of the data array output from the equalizer; and
    an adjusting step of adjusting the threshold value in the comparator in a direction in which a difference between the threshold value and the reference value in the sampler increases when a counted value of the inequality counter is zero, and adjusting the gain of the equalizer when the counted value of the inequality counter is not zero,
    wherein the counting step and the adjusting step are performed every period.

10. The equalizer adjusting method according to claim 9, wherein in the counting step, an error counter counts events in which an error is detected in a logical value array output from the sampler, every period, and
wherein in the adjusting step, the gain of the equalizer is adjusted based on the counted value of the inequality counter and a counted value of the error counter.

11. The equalizer adjusting method according to claim 9, wherein in the counting step,
the threshold value in the comparator is larger than the reference value in the sampler, and
a counting operation of the inequality counter is selectively performed in a case where the logical value output from the sampler is input when the voltage value of each bit input to the sampler is larger than the reference value.

12. The equalizer adjusting method according to claim 10, wherein in the counting step,
the threshold value in the comparator is larger than the reference value in the sampler, and
a counting operation of the inequality counter is selectively performed in a case where the logical value output from the sampler is input when the voltage value of each bit input to the sampler is larger than the reference value.

13. The equalizer adjusting method according to claim 9 wherein in the counting step,
the threshold value in the comparator is smaller than the reference value in the sampler, and
a counting operation of the inequality counter is selectively performed in a case where the logical value output from the sampler is input when the voltage value of each bit input to the sampler is smaller than the reference value.

14. The equalizer adjusting method according to claim 10 wherein in the counting step,
the threshold value in the comparator is smaller than the reference value in the sampler, and
a counting operation of the inequality counter is selectively performed in a case where the logical value output from the sampler is input when the voltage value of each bit input to the sampler is smaller than the reference value.

15. A receiver comprising:
an equalizer including an input terminal, an output terminal, and a gain adjustment terminal;
a sampler which includes
a first input terminal connected to the output terminal of the equalizer, and
a second input terminal to which a first reference value is input;
a comparator which includes
a first input terminal connected to the output terminal of the equalizer, and
a second input terminal to which a second reference value is input;
an inequality counter which includes
a first input terminal connected to an output terminal of the sampler, and a second input terminal connected to an output terminal of the comparator; and
an adjuster which includes
an input terminal connected to an output terminal of the inequality counter,
a first output terminal connected to the gain adjustment terminal, and
a second output terminal connected to the second input terminal of the comparator.

16. The receiver according to claim 15, further comprising:
an error counter which counts events in which an error is detected in a logical value array output from the sampler, every period,
wherein the adjuster adjusts a gain of the equalizer based on a counted value of the inequality counter and a counted value of the error counter.

17. The receiver according to claim 15,
wherein the second reference value in the comparator is larger than the first reference value in the sampler, and
wherein the inequality counter selectively performs a counting operation in a case where a logical value output from the sampler is input when a voltage value of each bit input to the sampler is larger than the first reference value.

18. The receiver according to claim 15,
wherein the second reference value in the comparator is smaller than the first reference value in the sampler, and
wherein the inequality counter selectively performs a counting operation in a case where a logical value output from the sampler is input when a voltage value of each bit input to the sampler is smaller than the first reference value.

19. A signal transmitting and receiving system comprising:
a transmitter which outputs a data array; and
the receiver according to claim 15 to which the data array that has been output from the transmitter and has arrived via a transmission path is input.

* * * * *